(12) United States Patent
Zolty et al.

(10) Patent No.: US 10,380,923 B2
(45) Date of Patent: Aug. 13, 2019

(54) MODULAR FLIP-DISC DISPLAY SYSTEM AND METHOD

(71) Applicant: BREAKFAST, LLC, Brooklyn, NY (US)

(72) Inventors: Andrew Zolty, Brooklyn, NY (US); Mattias Gunneras, Brooklyn, NY (US)

(73) Assignee: BREAKFAST, LLC, Brooklyn, NY (US)

( * ) Notice: Subject to any disclaimer, the term of this patent is extended or adjusted under 35 U.S.C. 154(b) by 0 days.

(21) Appl. No.: 15/824,244

(22) Filed: Nov. 28, 2017

(65) Prior Publication Data

US 2018/0336805 A1   Nov. 22, 2018

Related U.S. Application Data

(60) Provisional application No. 62/426,945, filed on Nov. 28, 2016.

(51) Int. Cl.
| | | |
|---|---|---|
| *G06F 3/048* | (2013.01) | |
| *G09F 9/302* | (2006.01) | |
| *G06F 3/14* | (2006.01) | |
| *G09F 9/37* | (2006.01) | |

(52) U.S. Cl.
CPC .......... *G09F 9/3026* (2013.01); *G06F 3/1438* (2013.01); *G06F 3/1446* (2013.01); *G09F 9/375* (2013.01)

(58) Field of Classification Search
CPC combination set(s) only.
See application file for complete search history.

(56) References Cited

U.S. PATENT DOCUMENTS

2017/0039194 A1* 2/2017 Tschetter ............... G16H 10/60
2017/0307341 A1* 10/2017 Hollinger ............ A63F 11/0051

* cited by examiner

*Primary Examiner* — Van N Chow
(74) *Attorney, Agent, or Firm* — Run8 Patent Group, LLC; Peter Miller

(57) ABSTRACT

One variation of a method for updating a flip-disc display includes, at each panel controller within each panel within the flip-disc display: accessing a frame defining target color positions of flip-disc pixels in each module in the corresponding panel; designating a subset of flip-disc pixels in the panel based on differences between target color positions of flip-disc pixels defined in the frame and current color positions of flip-disc pixels in the panel; defining a discontinuous order for serially issuing update commands to each module in the panel; and, during each update instance in a series of update instances within the current update cycle, serving a next update command to each module in the panel to invert one flip-disc pixel in each module in the panel according to the discontinuous order of update commands assigned to each module in the panel.

20 Claims, 5 Drawing Sheets

MODULAR FLIP-DISC DISPLAY SYSTEM AND METHOD

CROSS-REFERENCE TO RELATED APPLICATIONS

This Application claims the benefit of U.S. Provisional Application No. 69/426,945, filed on 28 Nov. 2016, which is incorporated in its entirety by this reference.

TECHNICAL FIELD

This invention relates generally to the field of flip-disc displays and more specifically to a new and unique modular flip-disc display system and method in the field of flip-disc displays.

DESCRIPTION OF THE EMBODIMENTS

Figure 1:
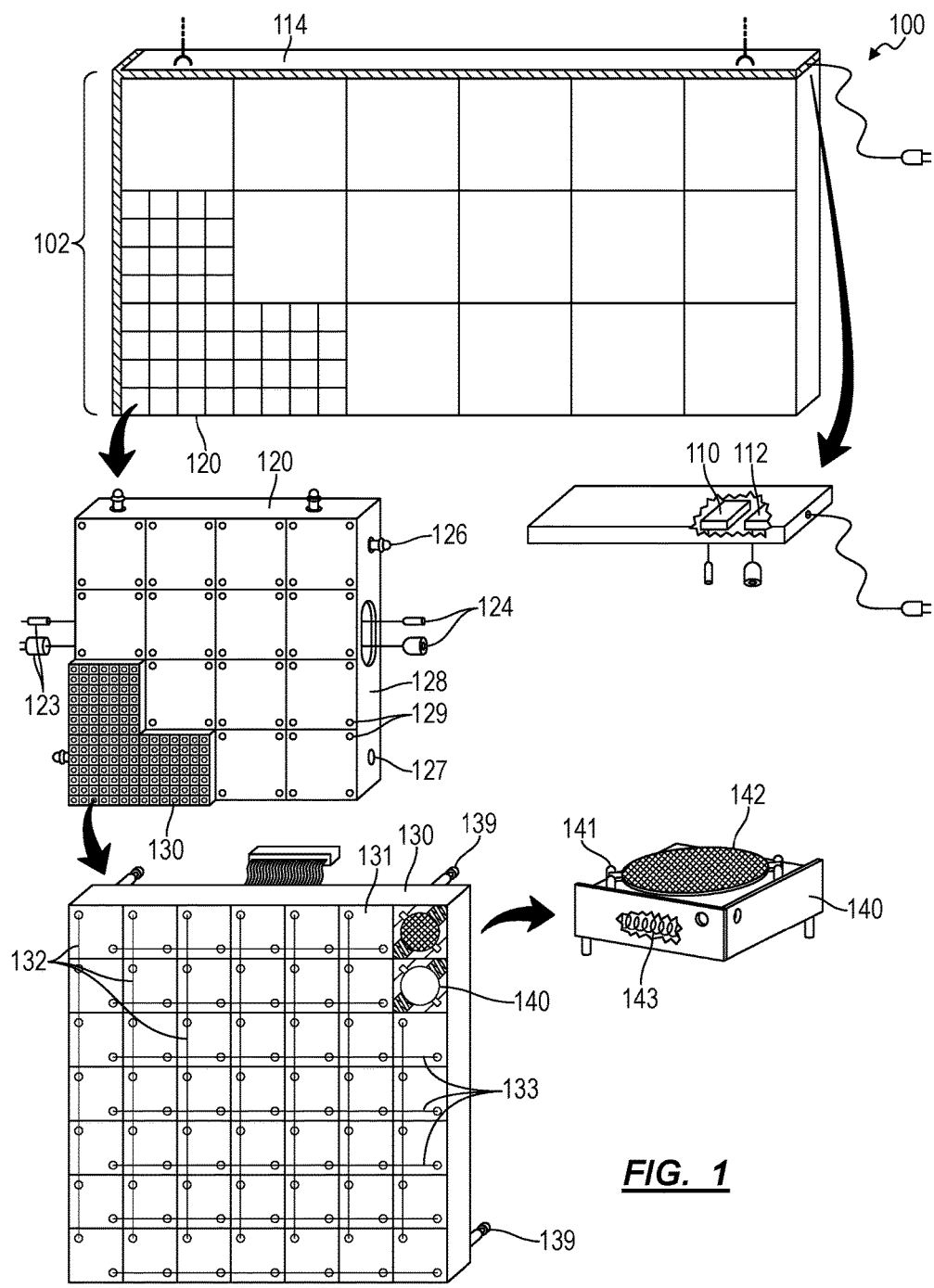
FIG. 1 is a flowchart representation of a display system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Display System

As shown in FIGS. 1 and 2A-2C, a display system 100 includes: a set of panels arranged in a global grid array; and a master controller 110. Each panel 120 in the set of panels includes: a chassis 128; a panel controller 121; and a set of modules transiently coupled to the chassis 128 in a regional grid array and electrically coupled to the panel controller 121. Each module 130 in the set of modules includes: a set of parallel and offset column electrodes 132; a set of parallel and offset row electrodes 133, each row electrode in the set of row electrodes 133 crossing over and electrically isolated from each column electrode in the set of column electrodes 132; a driver configured to selectively drive each column electrode in the set of column electrodes 132 and each row electrode in the set of row electrodes 133 between a voltage-HI state, a voltage-LO state, and a high-impedance state according to an update command received from the panel controller 121; and a set of flip-disc pixels arranged in a local grid array across the module 130. Each flip-disc pixel 140 includes: a disc support 141 arranged proximal an intersection of one column electrode in the set of column electrodes 132 and one row electrode in the set of row electrodes 133; a disc arranged in the disc support 141, defining a first color across a first side, and defining a second color across a second side opposite the first side; and an electromagnetic element 143 proximal the disk support and electrically coupled to one column electrode in the set of column electrodes 132 and one row electrode in the set of row electrodes 133, configured to flip the disc to expose the first side of the disc when the column electrode is driven to the voltage-HI state and the row electrode is driven to the voltage-LO state, and configured to flip the disc to expose the second side of the disc when the column electrode is driven to the voltage-LO state and the row electrode is driven to the voltage-HI state. The master controller 110 is configured to serve a sequence of frames to panel controllers 121 in the set of panels. Upon receipt of a frame from the controller, each panel controller 121 selectively issues update commands to the driver in the corresponding module 130 to invert a subset of flip-disc pixels in the corresponding module 130 according to target color positions specified in the frame for the subset of flip-disc pixels.

2. Method

Figure 3:
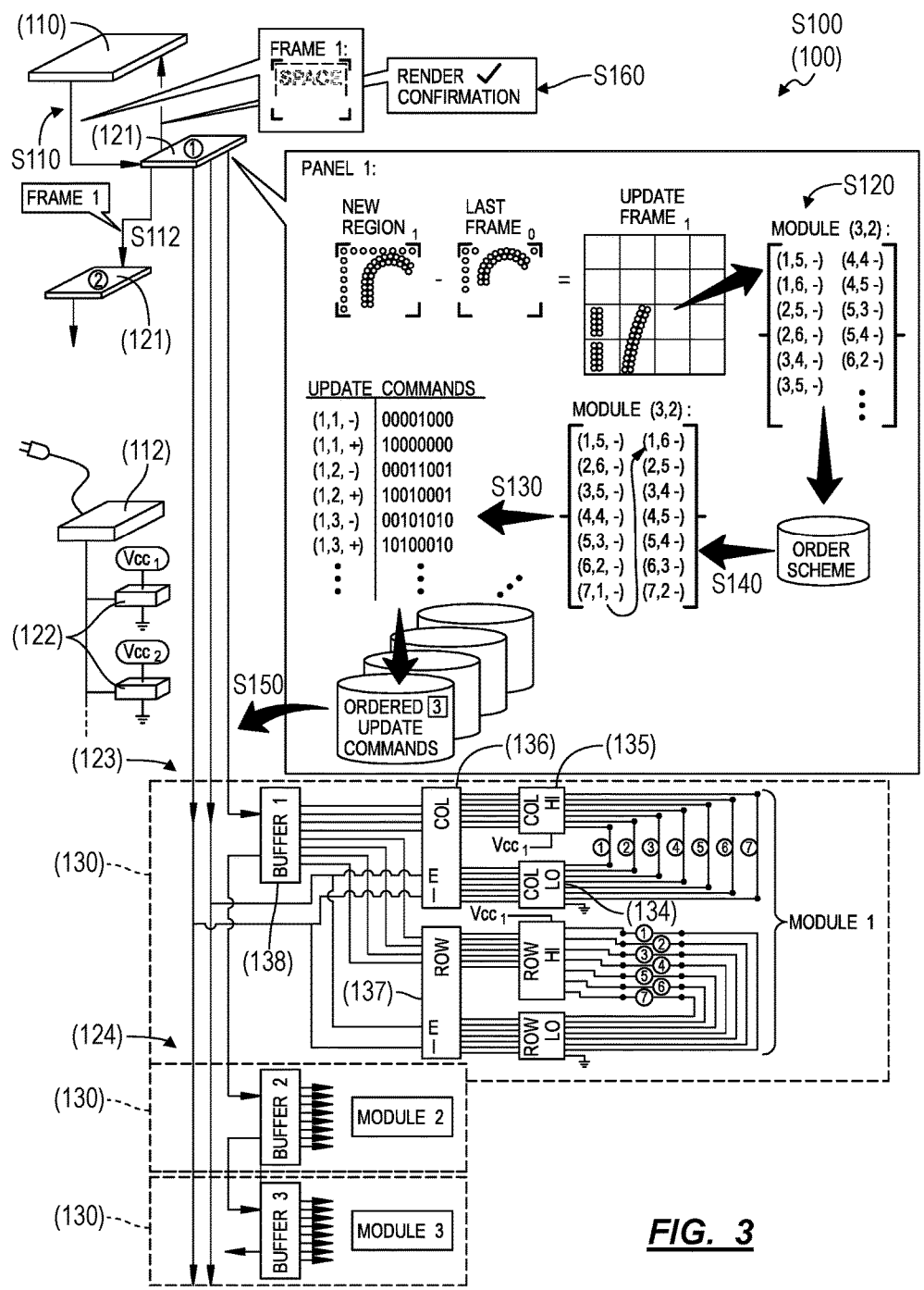
FIG. 3 is a schematic representation of a method.

As shown in FIG. 3, a method S100—for updating a flip-disc display 102 including an array of panels, each panel 120 in the array of panels including a grid array of modules, each module 130 in the grid array of modules including a grid array of flip-disc pixels—includes: at a first panel controller 121 electrically coupled to a first array of modules arranged within a first panel 120, accessing a new frame region defining a target color position of each flip-disc pixel 140 in each module 130 in the first panel 120 in Block S110; designating a subset of flip-disc pixels in the first panel 120 for inversion during a current update cycle based on differences between target color positions of flip-disc pixels defined in the new frame region and current color positions of flip-disc pixels in the first panel 120 in Block S120; for each flip-disc pixel 140 in the subset of flip-disc pixels, accessing an update command executable by a corresponding module 130 in the first panel 120 to invert the color position of the flip-disc pixel in Block S130; defining an order for serially issuing update commands to each module 130 in the first panel 120 in Block S140, the order skipping flip-disc pixels excluded from the subset of flip-disc pixels and specifying a discontinuous sequence of inversions of flip-disc pixels across an area of each module 130 in the first array of modules; and, during each update instance in a series of update instances in the current update cycle, serving a next update command to each module 130 in the first panel 120 to invert one flip-disc pixel in each module 130 in the first panel 120 according to the order for serially issuing update commands defined for each module 130 in the first panel 120 in Block S150.

Figure 4:
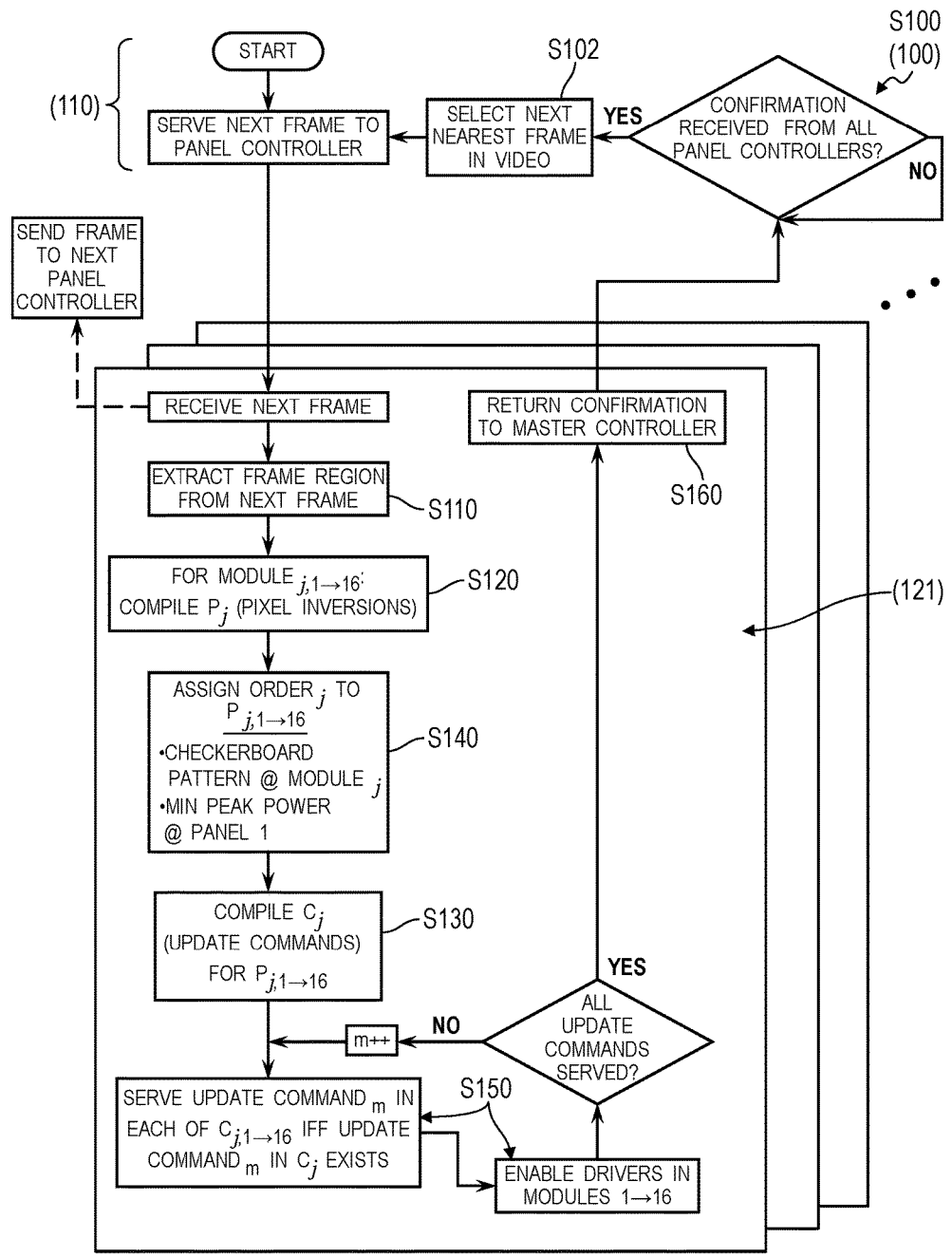
FIG. 4 is a flowchart representation of one variation of the method.

As shown in FIG. 4, one variation of the method S100 includes: at a first panel controller 121 electrically coupled to a first array of modules arranged within a first panel 120, accessing a new frame region defining a target color position of each flip-disc pixel 140 in each module 130 in the first panel 120 in Block S110. This variation of the method S100 also includes, for each module 130 in the first panel 120: identifying a subset of flip-disc pixels in the module 130 for inversion during a current update cycle based on a difference between pixel values in the new frame region and current color positions of corresponding pixels in the module 130 in Block S120; compiling a set of update commands for the module 130 for the current update cycle, each update command in the set of update commands corresponding to a particular flip-disc pixel in the module 130 and executable by the module 130 to invert the color position of the particular flip-disc pixel in Block S130; and defining a pixel order for serially issuing update commands in the set of update commands to the module 130 in Block S140, the pixel order skipping flip-disc pixels excluded from the subset of flip-disc pixels and specifying a discontinuous sequence of inversions of flip-disc pixels in the subset of flip-disc pixels to yield a substantially uniform distribution of flip-disc pixel inversions across an area of the module 130. This variation of the method S100 further includes: during each update instance in a sequence of update instances within the current update cycle, distributing next update commands, in sets of update commands compiled for the current update cycle, to each corresponding module 130 in the first panel 120 according to pixel orders defined for each set of update commands in Block S150.

3. Applications

Figure 2A:
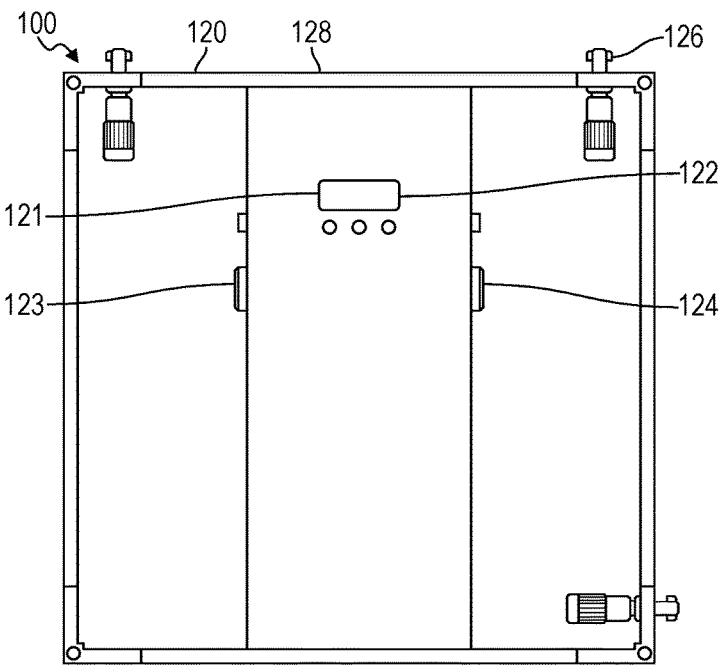
FIGS. 2A, 2B, and 2C are schematic representation of one variation of the display system.
Figure 2B:
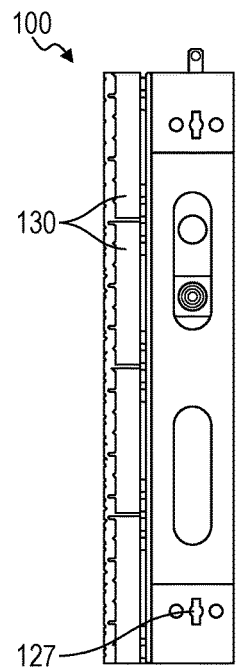
Figure 2C:
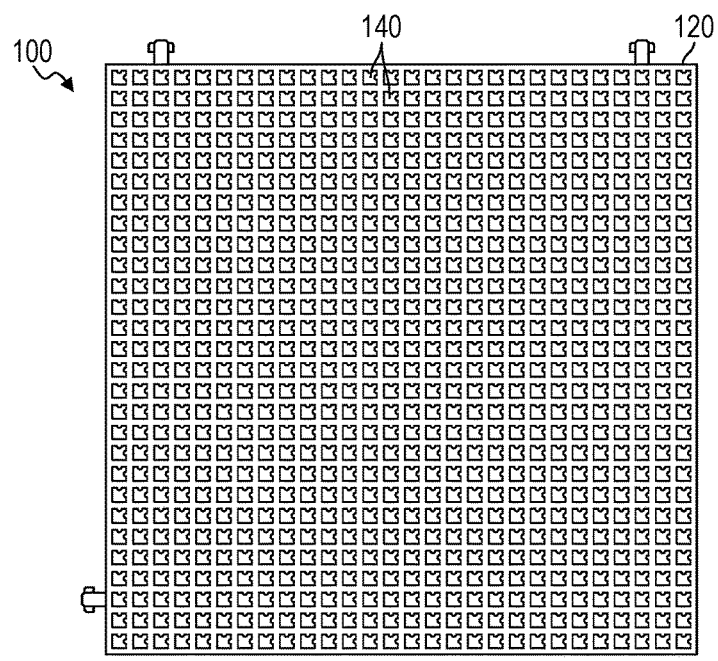

Generally, the display system 100 defines a modular flip-disc display 102 that includes a master controller 110 and a set of panels configurable in a variety of display formats including one, dozens, or hundreds of panels arranged across one or more planar or non-planar surfaces. Each panel includes multiple modules (e.g., a 4×4 grid array of modules) and a panel controller 121 configured to issue commands to modules within the panel to selectively invert states of flip-disc pixels within these modules based on states of virtual pixels within a region of a frame—received from the master controller 110—corresponding to the area of panel. Each module includes multiple individually-addressable flip-disc pixels (e.g., a 7×7 grid array of flip-disc pixels) and a driver configured to selectively energize flip-disc pixels in the module based on commands received from the panel controller 121 in the same panel, as shown in FIGS. 2A-2C. Each flip-disc pixel 140 includes a disc exhibiting one distinct color per side, a disc support 141 that supports the disc, and an electromagnetic element 143 (e.g., a solenoid arranged in the disc support 141 or mounted directly to the disc) that produces an electromagnetic field that causes the disc to invert when the polarity of the electromagnetic element 143 is inverted, as shown in FIGS. 1 and 2A-2C.

Figure 5:
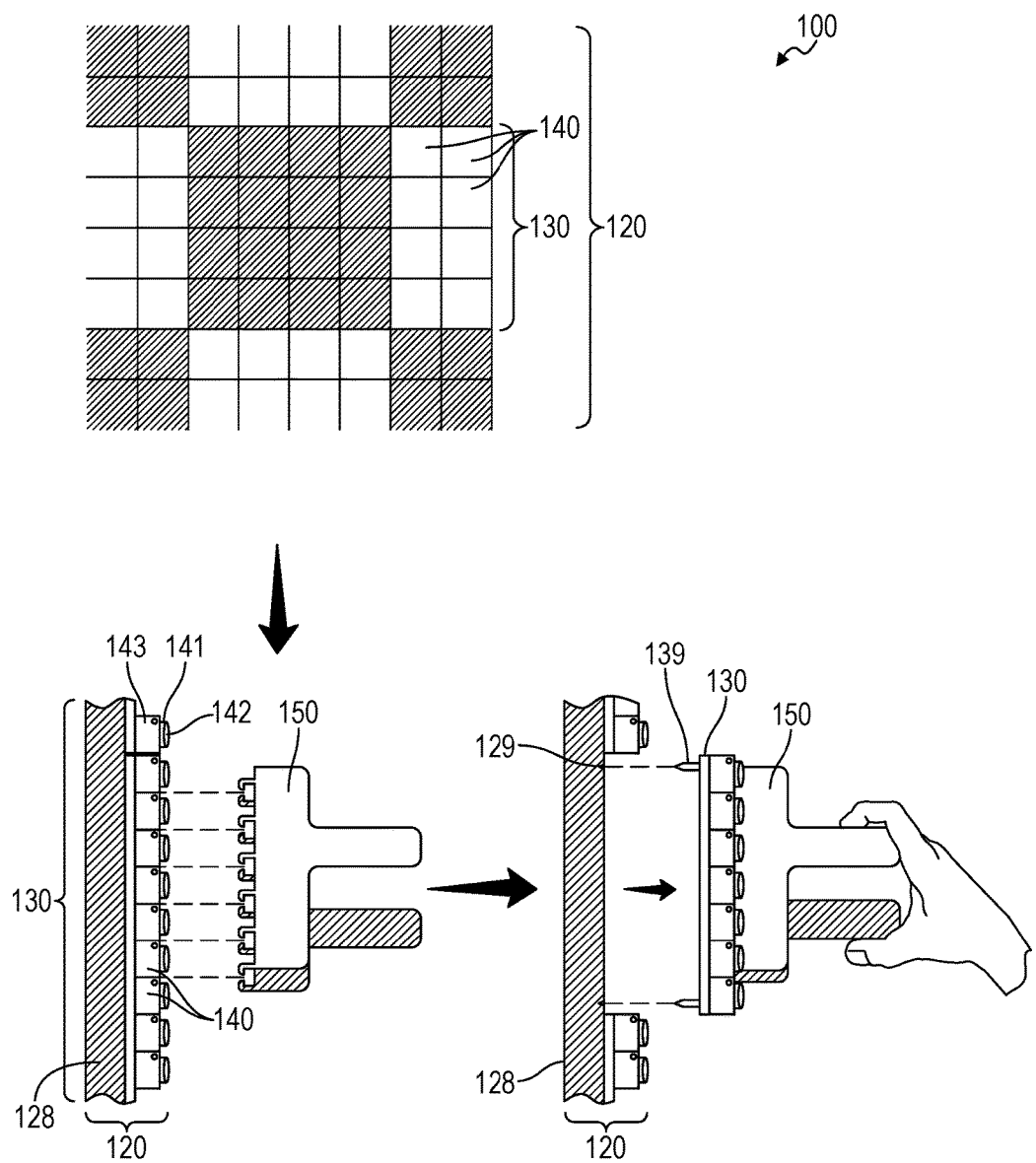
FIG. 5 is a schematic representation of one variation of the display system.

The display system 100 includes discretized display elements that can be configured into many different sizes and arrangements of flip-disc displays 102 with easily-serviced components. In particular, each flip-disc pixel 140 defines a single multi-state visual element; each module includes many (e.g., 49) flip-disc pixels and drivers configured to energize individual flip-disc pixels within the module to selectively invert states of these flip-disc pixels; and each panel includes many (e.g., 16) removable abutting modules, a panel power supply 122 configured to power each of these modules, and a controller configured to issue commands to each module in the panel to invert select flip-disc pixels in these modules according to a corresponding area in a frame received from the master controller 110, as shown in FIG. 5. Multiple panels can thus be combined with a master controller 110 (and a master power supply 112, such as a power strip or surge protector) to form a much larger display in any number of lengths and widths spanning one or more planar or non-planar wall, floor, and/or ceiling surfaces. In particular, flip-disc pixels can extend to the edge of each module; and modules within a panel can abut with no or minimal gaps between adjacent modules such that a grid array of flip-disc pixels spanning a complete panel appears continuous across the width and height of the panel, as shown in FIGS. 1 and 5. Furthermore, modules—and therefore flip-disc pixels—can extend to all edges of a panel; and panels within the flip-disc display 102 can abut with no or minimal gaps between adjacent panels such that a grid array of flip-disc pixels spanning a complete flip-disc display 102 appears continuous across the width and height of the flip-disc display 102. The master controller 110 can then serve frames—such as from a recorded video or from a live video feed—to each panel controller 121, and each panel controller 121 can generate a set of commands to invert states of flip-disc pixels in its panel according to pixel values in a corresponding region of the frame and sequentially serve these commands to corresponding modules in its panel during an update cycle in order to realize this region of the frame.

Therefore, a master controller 110 can be connected—in parallel or in series—to many panels. The master controller 110 can also serve a sequence of frames—wherein each frame defines target states (i.e., color positions) of each flip-disc pixel 140 in the assembly of panels—to these panels and serve a clock or other trigger signal to these panels to trigger these panels to execute flip-disc pixel inversions according to the current frame.

A panel can define a human-manageable size and weight and can be combined with one or many like panels to form a custom flip-disc display 102. The panel can also include all internal power distribution and control functions sufficient: to calculate a sequence of flip-disc pixel inversions necessary to realize a corresponding region of a frame received from a master controller 110; to distribute commands for these flip-disc pixel inversions across all corresponding flip-disc pixels within the panel; and to trigger each module in the panel to execute these commands. By handling power distribution and control functions for many modules—each containing many flip-disc pixels—in the panel, the panel can define a standard assembly unit to ease both mechanical assembly of a large flip-disc display 102 and simplify communication protocols across such a flip-disc display 102.

Furthermore, a module: can include many flip-disc pixels; and can include local drivers and all other circuitry necessary to address and invert select flip-disc pixels according to commands received from the panel controller 121 in its corresponding panel. By combining many flip-disc pixels and related drivers into one package (i.e., one module), the module can simplify assembly of each flip-disc pixel 140 while also limiting a total number of components necessary to individually control these flip-disc pixels.

Conversely, a module can contain a limited total number of flip-disc pixels in one package such that component failure is limited to a relatively small region of a panel, which may similarly constitute a relatively small region of the flip-disc display 102. Thus, should a flip-disc pixel, integrated circuit, or other component within a module fail or otherwise become damaged, the entire module may be removed from the panel and served or replaced without disturbing all other modules in the panel, thereby simplifying and improving serviceability of a panel and a flip-disc display 102 as a whole.

The display system 100 can therefore include hierarchical flip-disc display 102 components (i.e., panels, modules, and individual flip-disc pixels) that cooperate to balance: extensive customizability of a flip-disc display 102 with a standard assembly unit (i.e., panels); simple mechanical, power, and data connections between these standard assembly units via discrete panels that each contain integrated power and control functions; rapid refresh rates across an entire flip-disc display 102 through parallel processing of new frames both across all panels in the flip-disc display 102 and across all modules in each panel; and rapid, pinpoint servicing of flip-disc pixels through extraction, repair, or replacement of discrete modules.

Furthermore, the master controller 110 and panel controllers 121 within each panel in the display system 100 can execute select Blocks of the method S100 to select a current frame, identify a subset of flip-disc pixels in the flip-disc display 102 with current states that differ from corresponding pixel values in the current frame, to generate a set of commands to invert these select flip-disc pixels, and to execute these commands during an update cycle and before a next frame is issued by the master controller 110. In particular, each panel controller 121 can identify a subset of flip-disc pixels—across each module in its corresponding panel—to invert during a current update cycle based on differences between pixel values in a region of the current frame corresponding to the panel and current states (i.e., color positions) of corresponding flip-disc pixels in the panel (e.g., based on a differences between pixel values in this region of the current frame and pixel values at corresponding positions in a like region of a preceding frame). The pixel controller can then serve update commands to invert these flip-disc pixels to modules in this panel and skip serving commands corresponding to flip-disc pixels that are already in a correct state for the current frame, thereby completing refresh of the entire panel according to the new frame more rapidly than serving an update command to every flip-disc pixel in the panel.

Furthermore, the panel controller 121 can implement one or various order schema to set an order for updating states of flip-disc pixels in each module in order to: minimize a total time to update all flip-disc pixels in the panel; minimize a total number of flip-disc pixel inversions (and therefore power consumption) across the panel per update instance within an update cycle; and/or yield smoother, less visually-perceptible transitions from frame to frame at each module in the panel. In particular, because each flip-disc pixel 140 includes both a mechanical element that is physically moved and an electromagnetic element 143 that is energized during an inversion cycle, updating positions of many flip-disc pixels across several modules within a panel may require a relatively large amount of energy and may occur over an extended duration of time visually detectable by a human observing the flip-disc display 102. A panel controller 121 in each panel can therefore implement order schema—either independently or in cooperation with other panel controllers 121 in the flip-disc display 102—according to the method S100 to decrease a total refresh time, limit peak consumption in each update instance within an update cycle, and/or smooth inter- and/or intra-module transitions from frame to frame.

4. Module and Flip-Disc Pixel

The display system 100 includes multiple panels 120, each panel 120 including multiple modules 130, each module 130 including multiple flip-disc pixels 140.

In one implementation shown in FIGS. 1 and 5, each module 130 (or at least some modules in the display system 100) includes: a set of parallel and offset column electrodes 132; a set of parallel and offset row electrodes 133, wherein each row electrode in the set of row electrodes 133 crosses over and is electrically isolated from each column electrode in the set of column electrodes 132; a driver configured to selectively drive each column electrode in the set of column electrodes 132 and each row electrode in the set of row electrodes 133 between a voltage-HI state, a voltage-LO state, and a high-impedance state according to an update command received from the panel controller 121; and a set of flip-disc pixels arranged in a local grid array across the module In the foregoing implementation, each flip-disc pixel 140 includes: a disc support 141 arranged proximal an intersection of one column electrode in the set of column electrodes 132 and one row electrode in the set of row electrodes 133; a disc 142 arranged in the disc support 141, defining a first color (e.g., black) across a first side, and defining a second color (e.g., white) across a second side opposite the first side; and an electromagnetic element 143 proximal the disk support and electrically coupled to one column electrode in the set of column electrodes 132 and one row electrode in the set of row electrodes 133, configured to flip the disc to expose the first side of the disc when the column electrode is driven to the voltage-HI state and the row electrode is driven to the voltage-LO state, and configured to flip the disc to expose the second side of the disc when the column electrode is driven to the voltage-LO state and the row electrode is driven to the voltage-HI state. For example, one flip-disc pixel 140 can include: a disc 142 that includes a thin permanent magnet arranged inside and offset to one side of the disc 142; and an electromagnetic element 143 that includes a stationary permanent magnet arranged inside the disc support 141 and two coils arranged on opposing sides of the second permanent magnet. To flip the disc 142 in a first direction to expose a first colored side of the disc 142, the module 130 pulses the two coils in a first direction to flip the magnetic field in the stationary permanent magnet such that the two permanent magnets attract each other, thereby causing the disc 142 to flip in the first direction. To flip the disc 142 in a second direction to expose a second colored side of the disc 142, the module pulses the coils in a second direction to flip the magnetic field in the stationary permanent magnet such that the two permanent magnets repel each other, thereby causing the disc 142 to flip in the second direction.

In one example shown in FIG. 3, a module 130 includes a 7×7 grid array of discrete flip-disc pixels. In this example, the module 130 can include a two-sided printed circuit board (hereinafter "PCB"), including: seven discrete, parallel column electrodes 132 spanning a first side of the module PCB 131 and offset by a pitch distance corresponding to the width of each flip-disc pixel 140; and seven discrete, parallel row electrodes 133 spanning a second side of the module PCB 131 and offset by a pitch distance corresponding to the height of each flip-disc pixel 140. The set of column electrodes 132 and the set of row electrodes 133 can thus form 49 intersections, each corresponding to one flip-disc pixel location. The electromagnetic element 143 in each flip-disc pixel 140 can include a first terminal and a second terminal; when the first terminal of the electromagnetic element 143 is driven to a high voltage and the second terminal is connected to a low voltage or to ground, the electromagnetic element 143 can flip the adjacent disc in a first direction to expose a first side of the disc; when the second terminal of the electromagnetic element 143 is driven to the high voltage and the first terminal is connected to the low voltage or to ground, the electromagnetic element 143 can flip the adjacent disc in a second direction to expose a second side of the disc. A flip-disc pixel can thus be mounted to one side of the module PCB 131 at or near each column electrode/row electrode intersection; the first terminal of each flip-disc pixel 140 can be electrically coupled to the adjacent column electrode; and the second terminal of each flip-disc pixel 140 can be electrically coupled to the adjacent row electrode, such as by a via passing through the module PCB 131 to the row electrode on the second side of the module PCB 131.

In the foregoing example, the module can also include a set of high-side and low-side drivers 135, 134, multiplexers, and a buffer 138 (e.g., a shift register) mounted to the module PCB 131, as shown in FIG. 3. In particular, each column electrode can be connected to a high-current output channel of a high-side driver 135 and a high-current output channel of a low side driver. For example, each column electrode can be electrically coupled to one output channel of an eight-channel high-side driver 135 and to one output channel of an eight-channel low-side driver 134. Each of the seven active input channels in the high-side driver 135 and each of the seven active input channels in the low-side driver 134 can be electrically coupled to one digital output of a 4-to-16 line decoder (or "multiplexer" or "demuxer"). The four select channels of the decoder can be electrically coupled to four data output channels of an eight-bit buffer 138 (e.g., a shift register).

Similarly, each row electrode can be electrically coupled to one output channel of a second eight-channel high-side driver 135 and to one output channel of a second eight-channel low-side driver 134. Each of the seven active input channels in the second high-side driver 135 and each of the seven active input channels in the second low-side driver 134 can be electrically coupled to one digital output of a second 4-to-16 line decoder. The four select channels of the second decoder can be electrically coupled to the remaining four data output channels of the eight-bit buffer 138.

Write, clock, ground, and other input pins on the buffer 138 can then be coupled to data lines terminating at a set of header pins extending from the rear of the module PCB 131. An enable input pin on each decoder can be similarly coupled to a data line terminating at a header pin. When the module is installed in a panel, these header pins can align with and engage pin receptacles within the chassis 128 (e.g., mounted to a controller PCB hosting the panel controller 121) to electrically couple the buffer 138 and decoders to the panel controller 121. The module can include similar header pins extending from the rear of the module PCB 131, and these header pins can align with and engage similar pin receptacles within the chassis 128 to electrically couple to a panel power supply 122 within the panel. Alternatively, data and power input pins on the buffer 138 and decoders in the module can be electrically coupled to a panel controller 121 and a panel power supply 122 via a cable (e.g., a ribbon cable).

The panel controller 121 can thus write a command—in the form of eight bits—to the buffer 138 via these data lines, as shown in FIG. 3; the buffer 138 can then distribute these bits to select channels on the column and row decoders 136, 137. When the panel controller 121 then toggles the enable input pin on each decoder: the column decoder 136 transforms its received four-bit string into activation of one of its output channels, thereby transitioning a corresponding high-current output in one of the high- and low-side column drivers from a high-impedance state to an active state; and the row decoder 137 transforms its received four-bit string into activation of one of its output channels, thereby transitioning a corresponding high-current output in one of the high- and low-side row drivers from the high-impedance state to the active state. By thus writing this eight-bit command to the buffer 138 and toggling the enable input pins on the column and row decoders 136, 137, the panel controller 121 can connect an electromagnetic element 143—arranged in a flip-disc pixel located at the intersection of the now-active column and row channels—to power according to a polarity that inverts the position of the disc in this flip-disc pixel. Once the disc in the flip-disc pixel is thus inverted, the panel controller 121 can clear the strobe input channels on the column and row decoders 136, 137 to return the output channels of the column and row decoders 136, 137—and thus the outputs of the high- and low-side drivers 134—to the high-impedance state, thereby reducing current drain through the module and preventing further state changes of flip-disc pixels in the module.

Furthermore, a module can include a data and power output port, including: power and ground pass-through channels connected to power and ground input channels on the module; a serial write output channel connected to a serial output of the buffer 138; serial clock and serial latch output channels connected to serial clock and serial latch input channels on the buffer 138; and/or an enable output channel connected to enable input channels at the column and row encoders; etc. A set of modules arranged in one panel—such as all sixteen modules or each column of four modules in a 4×4 grid array of modules in one panel—can thus be connected in series via their data and power input ports and data and power output port, with a first module in this set connected to the panel controller 121 in the panel. The panel controller 121 can thus write update commands to a buffer 138 in each module 130 in this series of modules via a single serial write channel, a single serial clock channel, and a single serial latch channel. In particular, each module 130 can include both a data and power input port and a data and power output port that enable buffers 138 in multiple modules to be connected in series (or "daisy-chained") and controlled by a limited number of output channels in the panel controller 121, thereby enabling the panel controller 121 with a limited number of output channels to control all (e.g., 784) flip-disc pixels in many (e.g., sixteen) modules in the panel.

However, each flip-disc pixel 140 can include any other type or form of electromagnetic element 143 configured to invert a mechanical disc or other mechanical component of any other size, geometry, or color combination. Each module 130 can also include any other number of flip-disc pixels, can include any other channel or trace layout on a module PCB 131 or any other substrate, and can include any other integrated circuit components to enable individual control of each flip-disc pixel 140 in the module.

Furthermore, the module can include a set of standoffs 139 extending from the rear of the module PCB 131 and configured to engage (e.g., mate with and transiently retain) corresponding standoff receptacles 129 in a panel chassis 128, as shown in FIGS. 1 and 5. For example, the module: can define a square format with flip-disc pixels extending to each edge of the module; and can include one standoff 139 extending from the rear of the module PCB 131 proximal each corner and defining a tapered expanding pin. As described below, a panel can include a chassis 128 that defines a set of standoff receptacles 129, each configured to transiently receive one standoff 139 extending from a module. The standoff receptacles 129 can thus cooperate to retain multiple modules within the chassis 128 in a grid array (e.g., a 4×4 grid array). However, by biasing a module away from the chassis 128, standoffs 139 extending from the module can be withdrawn from corresponding standoff receptacles 129 in the chassis 128, thereby removing the module from the panel—such as for servicing or replacement—without disturbing other modules in the panel.

However, a module can be configured to transiently connect to or install in a panel in any other way.

5. Panel

Each panel 120—in a set of panels that form a flip-disc display 102—includes: a chassis 128; a panel controller 121; and a set of modules transiently coupled to the chassis 128 in a regional grid array and electrically coupled to the panel controller 121.

5.1 Chassis

In one example shown in FIGS. 1 and 2A, the chassis 128 includes a planar structure defining an array of features (e.g., standoff 139 receivers) configured to engage and transiently retrain a set of modules in a 4×4 grid array with flip-disc pixels in these modules extending to the perimeter to the chassis 128.

The chassis 128 can also include a set of inter-panel fasteners 126 arranged along two adjacent edges of the planar structure and fastener receivers 127 arranged along the two other edges of the planar structure. For example, the inter-panel fasteners 126 can include captured thumb screws; and the fastener receivers 127 can include captured nuts. A set of panels can thus be assembled into a flip-disc display 102 by installing thumb screws along an edge of one chassis 128 into corresponding fastener receivers 127 along an adjacent edge of an adjacent chassis 128, etc. In this example, flanges can extend along the perimeter of the planar structure of the chassis 128 opposite the modules, and the inter-panel fasteners 126 and the fastener receivers 127 can be arranged on these flanges, as shown in FIGS. 2A-2C, such that a set of panels may be assembled through access to the rear of these panels. However, each module 130 in this panel may be removed and replaced from the front of the panel by withdrawing standoffs 139 (or other features) on the module from corresponding features (e.g., standoff receptacles 129) in the chassis 128, as shown in FIG. 5.

5.2 Panel Controller

The panel controller 121 is configured to execute Blocks of the method S100 to: aggregate a set of update commands for each flip-disc in its panel based on known states of these flip-disc pixels and new target color states of the flip-disc pixels specified in a new frame received from the master controller 110; to group these update commands by corresponding module; and to set a pixel order for serving each group of update commands to the corresponding module in order to achieve certain power consumption, latency, and/or smooth perceived visual transition at each module 130. The panel controller 121 can then: simultaneously issue one update command—as available and according to corresponding pixel orders—to each module 130 in the panel during a first update instance with a current update cycle to trigger corresponding flip-disc pixels to simultaneously invert; simultaneously issue one next update command—as available and according to the corresponding pixel orders—to each module 130 in the panel during a second update instance within the current update cycle to trigger corresponding flip-disc pixels to simultaneously invert; and repeat this process until all update commands have been served to their corresponding modules and/or until the current update cycle otherwise is expired, as described below, as shown in FIG. 3.

The panel controller 121 can be arranged inside a housing mounted to a backside of the chassis 128 opposite modules in this panel, as shown in FIG. 2A. For example, the panel controller 121 can be mounted to a controller PCB arranged inside this housing.

In one implementation, a data input 123 of the panel controller 121 is connected to the master controller 110 via an input data cable, and a data output 124 of the panel controller 121 is connected (e.g., "daisy-chained") to a data input of a panel controller 121 in an adjacent panel via an output data cable. In this implementation, the master controller 110 can serve a complete frame and a clock signal to the panel controller 121 via the data cable; upon receipt of a frame from the master controller 110, the panel controller 121 can strip an array of target color positions for each flip-disc pixel 140 in its panel from this frame and then serve all or a remainder of the frame to a panel controller 121 in the next panel, which can repeat this process until the frame has been distributed to all panels in the flip-disc display 102. Alternatively, each panel controller 121 can be connected directly to the master controller 110 and can receive the entirety of a next frame from the master controller 110. Yet alternatively, the master controller 110 can segment the next frame into regions corresponding to each panel 120 in the flip-disc display 102 and distribute these frame regions to their corresponding panel controllers 121. However, a panel controller 121 in a panel can access all or a portion of a next frame in any other way and via any other parallel or serial (e.g., daisy-chained) communication protocol.

5.3 Power Supply+Data Connection

As shown in FIG. 3, each panel 120 can also include a panel power supply 122 configured to receive power from an external source and to distribute power to the panel controller 121 and to modules within the panel. For example, a panel can include a panel power supply 122 arranged adjacent a panel controller 121 inside a housing on a backside of the panel, and the panel power supply 122 can receive 120-Volt (or 240-Volt) AC power from a master power supply 112 (e.g., a power strip or surge protector) adjacent the master controller 110 or directly from a wall outlet via a power cable. The panel power supply 122 can regulate this 120-volt AC power signal down to 24 volts (or 3.3 Volts, 5 Volts, 12 Volts, etc.) DC and distribute this power to the controller PCB and thus to module PCBs 131. As described above, a power and data port in each module 130 can then be connected in parallel to the controller PCB to receive regulated power and data from the panel controller 121 and the panel power supply 122. Alternatively, a subset of modules in the panel can be connected to the controller PCB, and remaining modules in the panel can be daisy-chained to this subset of modules to receive power and/or data signals from the controller PCB.

The panel power supply 122 can also include an output power port (e.g., a pass-through output power port) that can be connected to an adjacent panel with a second power cable to supply 120-Volt (or 240-Volt, etc.) AC power to this adjacent panel. Like distribution of data from the master controller 110 to panel controllers 121 across the flip-disc display 102, power input and output ports on adjacent panels can therefore be daisy-chained together in order to simplify distribution of power across all panels in the flip-disc display 102.

Therefore, power and data ports 126, 127 of modules arranged within a panel can be connected in series to the panel controller 121 and panel power supply 122 within this panel; and power and data ports of panels within a flip-disc display 102 can be connected in series to the master controller 110 and master power supply 112 in order to simplify power routing, data line routing, panel assembly, and module assembly, etc. on both inter-panel and intra-panel levels within the flip-disc display 102.

However, modules can be configured to connect to the panel controller 121 and panel power supply 122 in any other way; panel controllers 121 and power supplies can also be configured to connect to the master controller 110 and master power supply 112 in any other way.

6. Flip-Disc Display

A set of like panels—defining a standard assembly unit—can thus be arranged in a global grid array (e.g., a 1×20, a 2×4, a 4×10, or a 40×100, etc. grid array) to form a flip-disc display 102. In one implementation shown in FIG. 1, a first row of panels can be mounted to (e.g., suspended from) a linear beam, and the beam 114 can be hung from a wall or from a ceiling. Additional rows or panels can be fastened to this first row of panels to expand a height of this flip-disc display 102.

Alternatively, a panel can be fastened directly to a wall surface, such as with drywall or concrete anchors passing through the chassis 128 of this panel to fasten the panel directly to the wall. Additional panels can be fastened laterally to this first panel and similarly fastened directly to the wall.

A master controller 110 and master power supply 112 can be arranged in a separate housing and mounted to an assembly of panels; power and data lines can then be installed between this housing and panels in the assembly. For example, the master controller 110 and master power supply 112 can be connected to a first panel in the assembly; the first panel can then distribute power and data from the master controller 110 to a second, adjacent panel; the second panel can then distribute power and data from the master controller 110 to a third panel; etc. Alternatively, the master controller 110 and master power supply 112 can be integrated into a first "master" panel, and the output power and data ports on the master panel can be connected to the output power and data ports on a second, adjacent panel; the second panel can then distribute power and data from the master controller 110 to a third panel; etc.

However, a set of panels can be assembled into any other format, and power and data can be distributed from the master power supply 112 and master controller 110 to these panels in any other way.

7. General Operation

Throughout operation, the master controller 110, panel controllers 121 in each panel 120, and drivers in each module 130 in the flip-disc display 102 can cooperate to execute Blocks of the method S100 during one update cycle to render a digital frame across the flip-disc display 102, as shown in FIGS. 3 and 4. The master controller 110, panel controllers 121 in each panel 120, and drivers in each module 130 can repeat these processes during one update cycle for each subsequent frame—in a prerecorded video or live video feed—to render this video or live video feed across the flip-disc display 102.

7.1 Next Frame

Generally, the master controller 110 functions to serve a sequence of frames (or correspond frame regions) to panels in the flip-disc display 102. In one example, the master controller 110 serves a sequence of two-color (e.g., black and white) frames from a prerecorded video to panels in the flip-disc display 102. In this implementation, the master controller 110 can locally: convert color frames in a video to a two-color format; compress, expand, crop, and otherwise reformat each two-color frame in the video such that one pixel in the frame corresponds to one flip-disc pixel in the flip-disc display 102. For example, for a 10×20 array of panels—each panel 120 including a 4×4 array of modules, each module 130 including a 7×7 array of pixels—the master controller 110 can reformat each color frame in the video to 280×560-pixel black-and-white frame. (Alternatively, the video can be reformatted remotely from the flip-disc display 102.)

At the beginning of a first update cycle, the master controller 110 can broadcast the entirety of a first 280×560-pixel black-and-white frame to all panels in the flip-disc display 102 via a serial multi-drop data bus. Panels within the flip-disc display 102 can thus receive this frame in parallel via the serial bus in Block S110, extract their corresponding 28×28-pixel regions from this frame, and begin executing corresponding flip-disc pixel inversions—according to subsequent Blocks of the method described below—substantially simultaneously.

Alternatively, at the beginning of a first update cycle, the master controller 110 can serve the entirety of a first 280×560-pixel black-and-white frame to a first panel controller 121; the first panel controller 121 can extract a first 28×28-pixel region corresponding to the first panel from this first frame and pass this first frame to a second panel controller 121; the second panel controller 121 can extract a second 28×28-pixel region corresponding to the second panel from this first frame and pass this first frame to a third panel controller 121; etc. During this first update cycle, the master controller 110 can also serve a clock or other synchronization signal to these panels—such as via the first panel—to trigger each panel controller 121 to update the color state of up to one flip-disc pixel in each of its modules during each of 49 update instances (i.e., one update instance per flip-disc pixel in a module) according to color values (e.g., "1" or "0" pixel values) of corresponding pixels in the first 280×560-pixel black-and-white frame.

Upon conclusion of a last update instance in this first update cycle, the master controller 110 can serve a second 280×560-pixel black-and-white frame to panel controllers 121 in the flip-disc display 102 and repeat this process in order to realize this second frame across the flip-disc display 102.

As described above, a module can be configured to accept one update command and to invert one corresponding flip-disc pixel during a single update instance. In the foregoing example, for a module containing 49 flip-disc pixels in a 7×7 array, the master controller 110 can trigger 49 update instances during one update cycle in order to enable the panel controller 121 in each panel 120 to trigger inversion of up to all flip-disc pixels in each module 130 in the panel, such as when an all-black frame succeeds an all-white frame. For panel controller 121 and modules that cooperate to invert one flip-disc pixel during one five-millisecond update instance, the master controller 110 can execute one update cycle per 250-millisecond period and thus serve new frames to panels in the flip-disc display 102 at a rate of 4 Hz.

The display system 100 is described herein as executing 250-millisecond (4 Hz) update cycles. However, the display system 100 can execute update cycles at any other frequency. For example, panel controllers and modules in the display system 100 can cooperate to invert one flip-disc pixel during one 350-microsecond update instance; and the master controller 110 can execute one update cycle per seventeen-millisecond period and thus serve new frames to panels in the flip-disc display 102 at a rate of ~60 Hz.

7.2 Panel-Specific Frame Region

In Block S110, a first panel controller 121—electrically coupled to a first array of modules arranged within a first panel—can access a new frame region defining a target color position of each flip-disc pixel 140 in each module 130 in the first array of modules.

In one implementation, the first panel controller 121: receives a new frame from a master controller 110; and extracts a first new frame region—corresponding to an area of the first panel and defining a target color position of each flip-disc pixel 140 in the first panel—from the new frame. In the foregoing examples in which each module 130 includes a 7×7 array of flip-disc pixels and each panel 120 includes a 4×4 grid array of modules, the first new frame region can include a 28×28 matrix containing a "1" or "0" value—corresponding to "black" and "white" target color positions, respectively, for the current update cycle—for each flip-disc pixel 140 in the first panel. The first panel controller 121 can store this new frame region for processing in subsequent Blocks described below.

Panel controllers in a other panel in flip-disc display 102 can simultaneously receive the new frame from the master controller 110 via the serial data bus and implement similar methods to extract corresponding new frame regions— defining a target color position of each flip-disc pixel 140 in each module 130 in their corresponding panels—from the new frame in Block S110.

Alternatively, the master controller 110 can segment the new frame into panel-specific regions and serve these new frame regions to their corresponding panel controllers 121 during the current update cycle. However, each panel controller 121 can access a target color position of each flip-disc pixel 140 in each module 130 in its corresponding panel in any other way in Block S110.

7.3 Pixel Inversions and Update Commands

Upon accessing a first new frame region in Block S110, the first panel can: designate a subset of flip-disc pixels in the first array of modules for inversion during a current update cycle based on differences between target color positions of flip-disc pixels defined in the new frame region and current color positions of flip-disc pixels in the first panel in Block S120; and, for each flip-disc pixel 140 in the subset of flip-disc pixels, accessing an update command executable by a corresponding module in the first array of modules to invert the color position of the flip-disc pixel in Block S130. In particular, in Block S120, the first panel controller 121 can filter a list of all flip-disc pixels in the panel down to a subset of flip-disc pixels that are not presently in a color position specified by the first new frame region based on a difference between the first new frame region and a preceding frame region rendered by the first panel during a last update cycle (or a last stored state of flip-disc pixels across the first panel). In Block S130, the first can transform this filtered list of flip-disc pixels into a set of update commands executable by modules in the first panel to invert these select flip-disc pixels into corresponding color positions specified in the first new frame region. Therefore, rather than issue an update command for every pixel in the first panel, which may be time- and/or power-intensive, the first panel controller 121 can execute Blocks S120 and S130 to compile a targeted set of update commands that specifically address flip-disc pixels currently occupying color positions that conflict with corresponding pixel values specified in the first new frame region.

In one implementation, the first panel controller 121: accesses a preceding frame region defining preceding target color positions for each flip-disc pixel 140 in the first panel during a preceding update cycle; and calculates an update image by subtracting the preceding frame region from the first new frame region. In this implementation, the preceding frame region, the first new frame region, and the update image can define identical image sizes (e.g., 28×28); and the preceding frame region and the first new frame region can include a "1" value or a "0" value at each pixel location to indicate target "black" or "white" color positions, respectively (or vice versa), for the corresponding flip-disc pixel in the first panel. Thus, when the preceding frame region is subtracted from the first new frame region, the resulting update frame can include: positive values (e.g., "1") that signal inversion of corresponding flip-disc pixels in the first panel from black to white color positions during the current update cycle; negative values (e.g., "−1") that signal inversion of corresponding flip-disc pixels in the first panel from white to black color positions during the current update cycle; and null pixel values that signal that corresponding flip-disc pixels are already occupying the target color position (i.e., no change to corresponding flip-disc pixels in the first panel is necessary during the current update cycle).

The first panel controller 121 can then designate all flip-disc pixels in the module corresponding to non-zero values in the update image for inversion during the current update cycle and tag each of these flip-disc pixels with an inversion direction according to the polarity of corresponding values in the update image. In particular, the first panel controller 121 can access an update command for each positive pixel value and for each negative pixel value in the update image. For example, to invert a particular flip-disc pixel in a particular module in the first panel from the black color position to the white color position, a low-side driver 134 in this module can pull a particular row electrode connected to this flip-disc pixel to ground, and a high-side driver 135 in this module can connect a particular column electrode connected to this flip-disc pixel to the panel power supply 122 (e.g., $V_{cc}$), which energizes the particular flip-disc pixel along a polarity that inverts the disc. To selectively pull the particular row electrode to ground, the first panel controller 121 can write a unique four-bit string to the row decoder 137, wherein this unique four-bit string uniquely sets a corresponding output channel on the 16-channel row decoder 137 to HI while maintaining other output channels in the row decoder 137 in high-impedance states. Similarly, to selectively connect the particular column electrode to the panel power supply 122, the first panel controller 121 can write a unique four-bit string to the column decoder 136, wherein this unique four-bit string uniquely sets a corresponding output channel on the 16-channel column decoder 136 to HI while maintaining other output channels in the column decoder 136 in high-impedance states. Furthermore, because select channels of the row and column decoders 137, 136 are connected to a common eight-channel buffer 138, the first panel controller 121 can concatenate the unique four-bit row and column strings into one unique eight-bit string (i.e., an "update command"). Therefore, by writing this unique eight-bit string to the buffer 138 in the module and then toggling enable input channels on the row and column decoders 137, 136 to trigger the decoders to update their outputs according to states of their select channels thus set by the buffer 138, the first panel controller 121 can trigger the module to invert the color position of the particular flip-disc pixel from black to white. However, because all other output channels of the row and column decoders 137, 136 remain in high-impedance states—and therefore because all other output channels of the low- and high-side row and column drivers remain in high-impedance states— all other flip-disc pixels in the module can remain unchanged as the particular pixel inverts. The panel controller 121 can implement other unique eight-bit strings to: trigger the module to invert the color position of the particular flip-disc pixel from white to black; and to selectively (i.e., individually) invert all other flip-disc pixels in the module.

In one example shown in FIG. 3, the first panel controller 121 stores two unique eight-bit strings per flip-disc pixel in a module, including one unique eight-bit string to invert a particular flip-disc pixel from the black color position to the white color position and another unique eight-bit string to invert a particular flip-disc pixel from the white color position to the black color position for each pixel in the module. In this example, the first panel controller 121 can also segment the update image into module-specific subregions, wherein each module 130-specific subregion corresponds to one module at a known location in the first panel, and wherein the location of each module 130 in the first panel is a function of how the module is connected to the first panel controller 121 and/or daisy-chained to other modules in the first panel. For a first of these module-specific subregions of the update image, the first panel controller 121 can match a location and polarity of each non-zero value in the first module-specific subregion to one unique eight-bit string in the lookup table to compile a first module-specific set of unique eight-bit strings that, when executed by a first module in the first panel, fully render the corresponding subregion of the first new frame region across the first module without superfluous update commands to set color positions of other flip-disc pixels already in the correct color positions in the first module. The first panel controller 121 can then address this first set of unique eight-bit strings to the first module. The first panel controller 121 can repeat this process for each other module in the first panel to compile one targeted set of unique eight-bit strings—addressed to one specific module—for each module 130 in the first panel.

Therefore, in Block S130, the first panel controller 121 can: identify a first module address of a first module, in the first array of modules, containing a first flip-disc pixel in the subset of flip-disc pixels necessitating inversion during the current update cycle; identify a first pixel address of the first flip-disc pixel in the first module; select a first update command from a lookup table based on the first pixel address and a target color position of the first flip-disc pixel specified in the new frame; and assign the first update command to the first module address in Block S130. The first panel controller 121 can repeat this process for each other flip-disc pixel in the subset of flip-disc pixels in Block S130 then distribute these update commands to corresponding modules in the first panel according to module addresses of these update commands in Block S150.

Therefore, in Block S130, the first panel controller 121 can compile one set of (e.g., between null and 49) update commands per module in the first panel, as shown in FIG. 3. However, the first panel controller 121 can implement any other method or technique to identify a subset of flip-disc pixels necessitating color position inversion according to a next frame received from the master controller 110 in Block S120 and to then transform this subset of flip-disc pixels into multiple module-specific sets of update commands in Block S130.

7.4 Pixel Order

Upon compiling one module-specific set of update commands for each module 130 in the first panel, the first panel controller 121 can define an order for serially issuing update commands to each module 130 in the first array of modules in Block S140. Generally, in Block S140, the first panel controller 121 can implement various schema to set an order for serving update commands to each module 130 in the first panel. For example, the first panel controller 121 can define an order: that skips flip-disc pixels excluded from the subset of flip-disc pixels calculated in Block S120; that specifies a discontinuous sequence of inversions of flip-disc pixels across an area of each module 130 in the first array of modules in order to yield human perception of smooth frame transition across the flip-disc display 102; that minimizes power consumption across the first panel (or across the entire flip-disc display 102) per update instance within an update cycle; or that minimizes refresh time across the first panel; as described below.

7.5 Update Cycle

Upon setting an order for distributing update commands to each module 130, the first panel controller 121 can serve a next update command to each module 130 in the first array of modules to invert one flip-disc pixel in each module 130 in the first array of modules according to the order for serially issuing update commands defined for each module 130 in the first array of modules during each update instance in a series of update instances in the current update cycle in Block S150. Generally, in Block S150, the first panel controller 121 can execute a series of update instances during a single update cycle to render the corresponding region of the new frame across all flip-disc pixels in its panel before a next frame is received from the master controller 110.

In particular, the first panel controller 121 can execute (up to) a number of update instances per update cycle equal to a number of flip-disc pixels in each standard module (e.g., 49 update instances per update cycle given a standard module that includes a 7×7 grid array of flip-disc pixels). During one update instance, the panel controller 121 can: select a next update command or a null (or "bye") value for each module 130 in the first panel according to the module-specific set of update commands compiled for each module 130 in Block S130 and according to the module-specific pixel order set for the module in Block S140; write these update commands to their corresponding modules in the first panel (e.g., according to module addresses assigned to these update commands, as described above); and then trigger each decoder in these modules to register their update commands, thereby triggering each module 130 that received an update command to invert one flip-disc pixel per the corresponding pixel value in the new frame in Block S150. The first panel controller 121 can repeat this process for each succeeding update instance in the update cycle in Block S150 until all update commands have been served to their corresponding modules in the first panel.

7.5.1 Intra-Module Flip-Disc Pixel Update

Therefore, for a first flip-disc pixel in a first module in the first panel, the first panel controller 121 can: designate the first flip-disc pixel for inversion from a first color position (e.g., black) to a second color position (e.g., white) based on differences between a target color position of the first flip-disc pixel defined in the new frame region and a current color position of the first flip-disc pixel in Block S120, such as specified in a previous frame or frame region stored locally on the first panel controller 121 since the preceding update cycle; access a first bit array, from a set of bit arrays stored in memory, executable by the first module to invert the color position of the first flip-disc pixel in Block S130; serve the first bit array to the first module; and then trigger the first module to execute the first module in Block S150. When executing this first bit array, the first module can: drive a first column electrode electrically coupled to the first flip-disc pixel in the first module to a high voltage; drive a first row electrode electrically coupled to the first flip-disc pixel in the first module to a low voltage to flip the first flip-disc pixel; and set remaining column electrodes 132 and remaining row electrodes 133 in the first module to high-impedance states to impede current flow through electromagnetic elements 143 in other flip-disc pixels in the first module to prevent the other flip-disc pixels from similarly inverting.

In particular, the first panel controller 121 can write the first bit array to the buffer 138 in the first module, which updates select channels on each column and row decoder 137. The first panel controller 121 can then toggle enable input channels on the column and row decoders 136, 137 to an "active" state at a start time, which triggers each column and row decoder 137 to shift one output channel from a high-impedance state to a voltage-HI state, thereby activating one channel in either of the high-side and low-side column drivers and activating one channel in either of the high-side and low-side row drivers and thus triggering the first flip-disc pixel to invert. At a time succeeding the start time by a pixel inversion duration (e.g., five milliseconds), the first panel controller 121 can then toggle enable channels on the column and row decoders 136, 137 to an "inactive" state (and/or toggle inhibit channels on the column and row decoders 136, 137) to return all output channels of the decoders to high-impedance states, thereby returning all output channels of high- and low-side column and row drivers in the first module to high-impedance states to complete this update instance.

The first panel controller 121 can repeat this process for each subsequent update instance—in the current update cycle—to which a pixel order for the first module has assigned an update command.

More specifically, a panel controller 121 in a panel 120 can: receive a new frame in Block S110; compare the new frame to a previous frame (e.g., stored in local memory on the panel controller 121) to isolate addresses of flip-disc pixels for inversion according to the new frame in Block S120; and set an update order for this subset of flip-disc pixels based on checkerboard, peak power, latency, and/or other rule in Block S140. In Block S150, the panel controller 121 can then: send serial data to update the first flip-disc pixel 140 in each module 130 in the panel 120—according to the module's assigned pixel order—on four parallel data buses (e.g., one data bus per column of modules); pull a latch signal low to simultaneously trigger all sixteen modules in the panel 120 to load inbound data to its buffer 138; and send a pulse signal to all four buses in parallel to enable outputs of drivers in each module—according to states of output channels of their corresponding buffers—for the duration of the pulse signal (e.g., between 300 and 500 microseconds), thereby inverting first flip-disc pixels in these modules. The panel controller can repeat this process until all pixel updates in the panel have been served to their corresponding and then wait for a next frame.

Furthermore, for an update instance to which the pixel order has assigned a null (or "bye") value to the first module, the first panel controller 121 can: serve a "bye" update command that results in no active output channels in the column and row drivers in the first module when executed; withhold toggling the enable channel on the column and row decoders 136, 137 in the first module; maintain inhibit channels on the column and row decoders 136, 137 in the first module in HI states; or implement any other method or update command to prevent a change of state of any flip-disc pixel in the first module.

7.5.2 Multi-Module Flip-Disc Pixel Update

During one update instance in Block S150, the first panel controller 121 can implement the foregoing methods to trigger single-pixel updates in each of multiple modules in the first panel substantially simultaneously during a single update instance, such as for each module 130 for which corresponding pixel orders—calculated in Block S140—specify an update command during the current update instance.

For example, during a first update instance in the current update cycle, the first panel controller 121 can: write a first update command—corresponding to a first flip-disc pixel in a first module in the first panel—to a first buffer 138 in the first module according to a first pixel order defined for the first module; write a second update command—corresponding to a second flip-disc pixel in a second module in the first panel—to a second buffer 138 in the second module according to a second pixel order defined for the second module; activate trigger (e.g., enable) input channels in the first buffer 138 and the second buffer 138 to invert the color positions of the first flip-disc pixel and the second flip-disc pixel substantially simultaneously at a first time; and then trigger each output channel in the first buffer 138 and the second buffer 138 to enter a high-impedance state at a second time succeeding the first time by an update instance duration (e.g., five milliseconds). During a second update instance succeeding the first update instance in the current update cycle, the first panel controller 121 can implement similar methods to: write a third update command—corresponding to a third flip-disc pixel in the first module—to the first buffer 138 according to the first pixel order; write a fourth update command—corresponding to a fourth flip-disc pixel in the second module—to the second buffer 138 according to the second pixel order; activate trigger (e.g., enable) input channels in the first buffer 138 and the second buffer 138 to invert color positions of the third flip-disc pixel and the fourth flip-disc pixel substantially simultaneously at a third time; and then trigger each output channel in the first buffer 138 and the second buffer 138 to enter the high-impedance state at a fourth time succeeding the third time by the update instance duration. The first panel controller 121 can repeat this process during each update instance in the current update cycle until all update commands for the current frame have been served to modules in the first panel or until a next frame is received from the master controller 110.

Furthermore, each panel controller 121 in other panels across the flip-disc can implement similar methods and techniques during each of a series of update instances within the current update cycle. For example, the master controller 110 can distribute a clock signal to each panel 120—such as in parallel or in series—to trigger the panels to synchronize update instances within the current update cycle. Furthermore, the master controller 110 and panel controllers 121 can repeat these processes over time to render each successive frame in a prerecorded video or live video feed during operation of the flip-disc display 102.

8. Pixel Order Scheme: Smooth Visual Update

As described above, each panel controller 121 can set an order for serving a set of update commands to each module 130 in its corresponding panel in Block S140. In particular, a panel controller 121 can implement a preset static scheme or dynamic scheme to set an order for updating a set of flip-disc pixels in each module 130, across the panel, or across the entire flip-disc display 102 in order to achieve smoother visual transition between frames, to limit power consumption during any one update instance, and/or to minimize latency between frames, etc.

8.1 Pixel Order Scheme: Smooth Visual Update

In one variation shown in FIGS. 3 and 4, the panel controller 121 implements an order scheme that distributes update commands across the height and width of each module 130—such as rather than scanning update commands linearly by column and then row—in order to yield perception of more uniform, non-directional update between frames across the module for humans viewing the flip-disc display 102 during operation. In particular, to complete color position change at a flip-disc pixel, the electromagnetic element 143 in the flip-disc pixel is energized over a non-trivial period of time (e.g., over one or more milliseconds); the resulting electromagnetic field emanating from the electromagnetic element 143 then physically moves (i.e., inverts) the physical disc in the flip-disc pixel over another non-trivial period of time.) Therefore while a single update instance to change a color position of one flip-disc pixel may be relatively fast and while motion of this disc may be faster than a typical human eye is capable of perceiving, many (e.g., up to 49) update commands executed by the module during one update cycle may occur over a much longer time scale such that an order in which these flip-disc pixels are inverted during the update cycle may be perceptible to the human eye.

For example, a typical human may be capable of detecting light flashes at over 30 Hz; given five-millisecond update instances and 49 flip-disc pixels per module, the flip-disc display 102 can implement 250-millisecond update cycles and thus operate at 4 Hz. If the panel controller 121 serves update commands to a module to invert color positions of flip-disc pixels scanning from left to right and then from top to bottom in the module, a human viewing the flip-disc display 102 may perceive "motion" or an "update flow path" at flip-disc pixel inversions across the module; this perceived "motion" may be further reinforced as the human views many update cycles.

In the secondary example described above in which panel controllers and modules cooperate to invert one flip-disc pixel during one 350-microsecond update instance and in which the master controller 110 executes one update cycle per seventeen-millisecond period, a delay of up to seventeen milliseconds may occur between inversion of a first flip-disc pixel and a last flip-disc pixel in one panel during one update cycle. The human eye may perceive a delay even on this short time scale and may thus perceive a linear update pattern across a single module 130 within the flip-disc display 102.

Therefore, the panel controller 121 can instead implement a checkerboard, pseudorandom, or otherwise non-linear update pattern for serving update commands to a module in order to achieve smoother perceived visual transition from frame to frame at the module during operation of the flip-disc display 102.

8.1.1 Checkerboard Pixel Order

In this variation, the panel controller 121 can implement a predefined, static pixel order scheme. For example, for a module including a 7×7 array of flip-disc pixels, the panel controller 121 can implement a predefined checkerboard pixel order that specifies: flip-disc pixel (1,1); then flip-disc pixel (1,3); then (1,5); (1,7); (2,2); (2,4); (2,6); (3,1); (3,3); (3,5); etc. on to flip-disc pixel (7,7); and then back to flip-disc pixel (1,2); (1,4); (1,6); (2,1); (2,3); (2,5); (2,7); (3,2); (3,4); etc. on to flip-disc pixel (7,6) to conclude the update cycle. To set the pixel order for serving update commands to this module during an update cycle, the panel controller 121 can reorder the set of update commands—corresponding to a subset of flip-disc pixels in this module—compiled in Block S130 according to this order. In this example, if the panel controller 121 determines that only flip-disc pixels (1,1), (1,2), (1,3), (1,4), (2,1), (2,2), (2,3), (3,1), (3,2), and (4,1) (e.g., the top left corner of the module) are to be inverted during the current update cycle, the panel controller 121 can assign the following pixel order to the module for this update cycle: (1,1), (1,3), (2,2), (3,1), (1,2), (1,4), (2,1), (2,3), (3,2), and (4,1) (with null or "bye" values for all other update instances in the update cycle).

Furthermore, for a second, adjacent module, the panel controller 121 can implement a mirrored checkerboard pattern that specifies: flip-disc pixel (1,2); then flip-disc pixel (1,4); then (1,6); (2,1); (2,3); (2,5); (2,7); (3,2); (3,5); (3,6); etc. on to flip-disc pixel (7,6); and then back to flip-disc pixel (1,1); (1,3); (1,5); (1,7); (2,2); (2,4); (2,6); (3,1); (3,1); etc. on to flip-disc pixel (7,7) to conclude the update cycle.

Therefore, a first panel controller 121 can: designate a first subset of flip-disc pixels—in a first module in a first panel—for inversion during a current update in Block S120; define a first pixel order for the first subset of update commands according to a checkerboard pattern in Block S140, wherein each site in the checkerboard pattern corresponds to one flip-disc pixel in the first module; and then sequentially serve one update command—in the first subset of update commands—to the first module according to the first pixel order during a series of update instances within the current update cycle, as shown in FIG. 3.

8.1.2 Pseudorandom Pixel Order

Alternately, upon compiling a set of update commands for a subset of pixels in a module, the panel controller 121 can implement a pseudorandom generator to assign a pseudorandom reorder to this set of update commands in Block S140 and then serve these update commands to the module accordingly during the current update cycle in Block S150.

For example, during an update cycle, the panel controller 121 can: designate a first subset of flip-disc pixels in a first module in the first array of modules for inversion during the current update cycle based on differences between target color positions of flip-disc pixels in the first module defined in the new frame region and current color positions of flip-disc pixels in the first module; and designate a second subset of flip-disc pixels in a second module in the first array of modules for inversion during the current update cycle based on differences between target color positions of flip-disc pixels in the second module defined in the new frame region and current color positions of flip-disc pixels in the second module in Block S120. The panel controller 121 can then: define a first pseudorandom order for the first subset of update commands; and define a second pseudorandom order—unique to the first pseudorandom order—for the second subset of update commands in Block S140. Finally, the panel controller 121 can: sequentially serve one update command in the first subset of update commands to the first module according to the first pseudorandom order; and sequentially serve one update command in the second subset of update commands to the second module according to the second pseudorandom order during the series of update instances within the current update cycle.

8.2 Color Position Borders

In another implementation, a panel controller 121 can order a set of update commands compiled for a module for a current update cycle based on proximity of corresponding flip-disc pixels to a border between a first group of pixels in the first color position (e.g., black) and a second group of pixels in the second color position (e.g., white) in Block S140. In particular, by ranking flip-disc pixels by proximity to a largest color border represented by the module at the conclusion of a last update cycle (or at the conclusion of the last update instance during the current update cycle) and then ordering update commands for the current cycle according to the rank of their corresponding flip-disc pixels, the panel controller 121 can execute the current update cycle such that flip-disc pixel inversions emanate outwardly from this color border, thereby yielding a smooth transition from the last frame to the current frame.

For example, the panel controller 121 can: scan a region of a preceding frame corresponding to a module for a largest color boundary (e.g., a larger black-and-white border) between color positions of flip-disc pixels in this module; and calculate a shortest distance from each flip-disc pixel 140 in the module to this largest color boundary. The panel controller 121 can then set the pixel order for a module such that: the first update command served to the module during the current update cycle corresponds to a first flip-disc pixel—specified for inversion in Block S120—nearest this largest color boundary represented by flip-disc pixels in the module at the conclusion of the preceding update cycle; the second update command served to the module during the current update cycle corresponds to a second flip-disc pixel—specified for inversion in Block S120—nearest a largest color boundary represented by flip-disc pixels in the module at the conclusion of the preceding update cycle or at the conclusion of the first update instance during the current update cycle; the third update command served to the module during the current update cycle corresponds to a third flip-disc pixel—specified for inversion in Block S120—nearest a largest color boundary represented by flip-disc pixels in the module at the conclusion of the preceding update cycle or at the conclusion of the second update instance during the current update cycle; etc. to completion of the set of update commands in Block 140.

Therefore, for a first module in a panel, the panel controller 121 can: identify a predominant border between flip-disc pixels currently in a first color position and flip-disc pixels currently in a second color position in the first module; define a first pixel order for the first subset of update commands—assigned to the first module—according to proximity of corresponding flip-disc pixels in the first module to the predominant border in the first module in Block S140; and then sequentially serve one update command in the first subset of update commands to the first module according to the first pixel order during the series of update instances within the current update cycle in Block S150.

The panel controller 121 can implement similar methods and techniques to rank flip-disc pixels in a module by proximity to the centroid of a largest color block in the module and then set a pixel order for the module accordingly in Block S140. Furthermore, the panel controller 121 can implement this process independently for each other module in its panel; and each panel controller 121 in the flip-disc display 102 can separately implement this process for each other module in its panel during an update cycle.

8.2 Power Conservation Scheme

The panel controller 121 can additionally or alternatively set an order for serving update commands to modules in its panel according to a power conservation scheme that minimizes a maximum number of commands executed during any other update instance within an update cycle in order to limit peak power consumption during operation of the flip-disc display 102.

Generally, energizing an electromagnetic element 143 in a flip-disc pixel to invert the color position of the flip-disc pixel may require a relatively large amount of power; and total power consumption within one panel during one update instance may be directly (i.e., linearly) proportional to a number of modules within the panel that are issued update commands issued during the update instance. However, since not all flip-disc pixels in all modules in a panel must be inverted during an update cycle to realize a corresponding region of a current frame, the panel controller 121 can set a pixel order that distributes update commands to each module 130 across many update instances within the current cycle in order to limit the maximum number of modules in the panel that receive an update command and thus limit peak power consumption during any one update instance in the update cycle.

In one example in which each module 130 includes 49 flip-disc pixels, each panel controller 121 in the flip-disc display 102 can implement 49 update instances per update cycle. Upon compiling one set of update commands per module in a panel in Block S130 (and upon setting an intra-module checkerboard or random update order for each set of update commands in Block S140), the panel controller 121 can rank these sets of update commands in order of decreasing size. The panel controller 121 can distribute update commands in the first-ranked set of update commands substantially uniformly across the series of 49 update instances scheduled for the current update cycle (e.g., every other update instance beginning with the first update instance for the first set of update commands that includes 25 update commands; every fifth update instance beginning with the first update instance for the first set of update commands that includes ten update commands; etc.). The panel controller 121 can then: distribute update commands in the second-ranked set of update commands substantially uniformly across the series of 49 update instances scheduled for the current update cycle with empty update instances prioritized; then distribute update commands in the third-ranked set of update commands substantially uniformly across the series of 49 update instances scheduled for the current update cycle with empty update instances prioritized first and then update instances with only one other assigned update command prioritized second; and then distribute update commands in the fourth-ranked set of update commands substantially uniformly across the series of 49 update instances scheduled for the current update cycle with empty update instances prioritized first, update instances with only one other assigned update command prioritized second, and update instances with only two other assigned update command prioritized third; etc. in order to generate an inter-module (or intra-panel) pixel order that minimizes a peak number of update commands served to modules in the panel during any one update instance in the current update cycle.

Alternatively, the panel controller 121 can: identify a particular module in the panel that necessitates the largest number of pixel inversions during the current update instance to realize the current frame; and then reduce the number of update instances executed by the panel during the current update cycle to this largest number of pixel inversions (e.g., 20 update instances in the current update cycle if the most pixel inversions for any one module in the panel is "20"). In the foregoing example, the panel controller 121 can: assign one update command in the first-ranked set of update commands to each update instance in this compressed number of update instances in the current update cycle; then distribute update commands in the second-ranked set of update commands substantially uniformly across the compressed series of update instances scheduled for the current update cycle; then distribute update commands in the third-ranked set of update commands substantially uniformly across the compressed series of update instances scheduled for the current update cycle with update instances with only one other assigned update command prioritized first; and then distribute update commands in the fourth-ranked set of update commands substantially uniformly across the compressed series of update instances scheduled for the current update cycle with update instances with only one other assigned update command prioritized first and update instances with only two other assigned update commands prioritized second; etc. The panel controller 121 can thus generate an inter-module (or intra-panel) pixel order that: minimizes a time for the panel to fully render the corresponding region of the current frame during the current update cycle; and that minimizes a peak number of update commands served to modules in the panel during any one update instance in this shortened update cycle.

The panel controller 121 can thus: implement an intra-module pixel order scheme (e.g., a checkerboard or pseudorandom pixel order) to order update commands for each module 130 in the panel; and then implement both intra-panel power conservation and latency schema to distribute these ordered sets of update commands for all modules in the panel across update instances within the current update cycle.

Therefore, for each module 130 in the first array of modules, the panel controller 121 can: identify a group of flip-disc pixels—arranged in the module—for inversion during the current update cycle based on differences between target color positions of flip-disc pixels in the module defined in the new frame region and current color positions of flip-disc pixels in the module in Block S120; generate a group of update commands corresponding to the group of flip-disc pixels, in the module, designated for inversion during the current update cycle in Block S130; and define a pixel order for the module and assign each update command, in the group of update commands associated with the module, to one update instance in the series of update instances in the current update cycle in Block S140, wherein a combination of pixel orders for modules in the first array of modules minimizes a number of update commands assigned to each update instance in the series of update instances in the current update cycle. The panel controller 121 can then selectively distribute update commands to modules in the set of modules according to pixel orders assigned to each module 130 in the first array of modules during each update instance in the current update cycle.

Furthermore, panel controllers 121 in each panel 120 across the flip-disc display 102 can cooperate to reduce a total number of update commands served to modules across the flip-disc display 102—and thus limit peak power consumption across the entire flip-disc display 102—during any one update instance within the current update cycle according to similar methods. For example, for each module 130 in a first panel, a first panel controller 121 in a first panel can define a pixel order for the module and assign each update command, in the group of update commands associated with the module, to one update instance in the series of update instances in the current update cycle; for each module 130 in the second array of modules, a second panel controller 121 in a second panel can define a pixel order for the module and assign each update command, in a group of update commands associated with the module, to one update instance in the series of update instances in the current update cycle; etc. for each other panel in the flip-disc display 102, wherein the combination of pixel orders for modules in the first panel, the second panel, etc. minimizes a number of update commands assigned to each update instance in the series of update instances in the current update cycle.

8.3 Speed/Refresh Rate

The panel controller 121 can additionally or alternatively set an order for serving update commands to modules in its panel according to a latency (or "refresh rate") scheme that yields a fastest refresh within each module 130 and/or across the entire panel to fully render corresponding regions of the current frame. For example, after ordering each set of update commands for each module 130 in a panel in Block S140, the panel controller 121 can: serve a first update command—if available—from every ordered set of update commands to its corresponding module during a first update cycle; serve a second update command—if available—from every ordered set of update commands to its corresponding module during a second update cycle; serve a third update command—if available—from every ordered set of update commands to its corresponding module during a third update cycle; etc. in Block S150 until a last update command in a largest ordered set of update commands is served. Alternatively, upon compiling one set of update commands per module in a panel in Block S130 (and upon setting an intra-module checkerboard or random update order for each set of update commands in Block S140), the panel controller 121 can: rank these sets of update commands in order of decreasing size; compress the current update cycle to a number of update instances equal to the number of update commands in the first-ranked set of update commands; serve one update command in the first-ranked set of updates commands to the corresponding module in the panel during each update instance in this compressed update cycle; and back-load update commands from other, shorter sets of update commands across the compressed update cycle such that refresh of every module in the panel is completed at approximately the same time at the conclusion of the compressed update cycle.

However, the panel controller 121 can implement any other intra-module, intra-panel, and/or inter-panel pixel order schema to set a pixel order for each module 130 in the panel during one update cycle.

9. Alternative Frame Rates

In one variation: a panel controller 121 can further execute Block S160, which recites returning confirmation of the new frame region to the master controller 110 in response to serving a last update command corresponding to a last flip-disc pixel in the subset of flip-disc pixels to a corresponding module in the first array of modules. In this variation, the master controller 110 can also execute Block S102, which recites selecting a second frame and serving the second frame to the array of panels in the flip-disc display 102 in response to receipt of confirmation from each panel controller 121 in the flip-disc display 102. Generally, in Blocks S160 and S102, panel controllers 121 and the master controller 110 can cooperate to confirm that a last frame was fully rendered by the flip-disc display 102 and to select a next frame to be rendered across the flip-disc display 102.

Furthermore, the natural frame rate of a prerecorded video or a live video (e.g., 24 Hz) may be greater than a nominal refresh rate for each module 130 (e.g., 49×five milliseconds, or approximately 2 Hz in a primary example; 49×350 microseconds, or approximately 60 Hz in a secondary example). However, a panel controller 121 can implement a latency scheme, as described above, to fully refresh each module 130 in its panel in less time than the nominal module refresh rate if fewer than all flip-disc pixels in each module 130 are designated for inversion during the current update cycle. Complete refresh of the flip-disc display 102 in less time than the nominal module frame rate may therefore be possible if every module in the flip-disc display 102 contains at least one flip-disc pixel not designated for inversion during the current update cycle. For example, upon serving all update commands to its modules during the current update cycle, each panel 120 can return confirmation to the master controller 110. Upon receipt of confirmation from every panel controller 121 in the flip-disc display 102, the master controller 110 can: calculate a refresh time from transmission of the last frame to the panel controllers 121 to receipt of confirmation from each panel controller 121; then select a next frame—in the live or prerecorded video—that falls nearest the sum of the time of the last frame and the refresh time; and then serve this next frame to panel controllers 121 in the flip-disc display 102. In particular, during playback of a video by the flip-disc display 102, the master controller 110 can select a next frame—succeeding the last frame in the video—nearest in time receipt of confirmation from a last panel controller 121 in the flip-disc display 102. The master controller 110 can thus implement a dynamic frame rate, such as an inverse function of a peak number of flip-disc pixels designated for inversion in any one module in the flip-disc display 102 during the last update cycle.

In another variation, the master controller 110 can implement a static frame rate. For example, the master controller 110 can implement a static frame rate that is faster than the nominal module frame rate. In this example, the master controller 110 may therefore serve a next frame to panel controllers 121 in the flip-disc display 102 before all of the panel controllers 121 serve a last update command to modules in their corresponding panels during the current update cycle. Each panel controller 121 can thus: maintain a "true" image of the state of each flip-disc pixel 140 in its panel during or upon conclusion of an update cycle; discard any unused update commands on the conclusion of the update cycle; and then compare a corresponding region of a next frame to its stored "true" image to determine which flip-disc pixels to invert during the next update cycle in Block S120.

However, the master controller 110 and panel controllers 121 can cooperate in any other way to implement a static or dynamic frame rate.

10. Service

As described above, each module 130 in a panel can be transiently installed in a panel and can be removed from its panel for servicing or replacement. In one variation shown in FIG. 5, the display system 100 further includes a module tool 150 configured to latch against features across an output face of a module and thus enable a user to withdraw the module out of the front of the panel. In particular, each module 130 in a panel can immediately abut an adjacent module in the panel to maintain consistent vertical and horizontal pitch distances between adjacent pixels across the full width and height of the panel such that an array of pixels within the panel appears continuous. Similarly, each panel 120 in a flip-disc display 102 can immediately abut an adjacent panel in the flip-disc display 102 to maintain consistent vertical and horizontal pitch distances between adjacent pixels across the full width and height of the flip-disc display 102 such that an array of pixels across an assembly of panels also appears continuous. Because adjacent modules within a panel and between adjacent panels closely abut, a gap between adjacent edges of their module PCBs 131 may be too tight to permit a module tool 150 to pass through this gap to engage the back face of one of these modules. Therefore, the module tool 150 can be configured to engage features on the outer face of a module in order to enable a user to draw the module out of its panel.

In one implementation, each module 130 can include a set of standoffs 139 configured to transiently engage a standoff receptacles 129 defined by a chassis 128 within a panel, as described above. In this implementation, the module tool 150: can be configured to selectively remove a single module from a panel; and can include a set of teeth operable in a first position to engage features on a subset of flip-disc pixels in the single module and operable in a set position to release features on the subset of flip-disc pixels in the single module.

For example, each flip-disc pixel 140 can include two thin wall segments extending along two adjacent (i.e., perpendicular) edges of the disc support 141, extending outwardly toward the front of the flip-disc pixel, and defining a perforation or tab proximal a corner at which these two thin wall segments meet. When multiple flip-disc pixels are assembled onto the module PCB 131, wall segments across these flip-disc pixels can cooperate to form horizontal and vertical walls between each flip-disc pixel 140 in the module with one perforation or tab proximal each corner of each flip-disc pixel 140 inset from the perimeter of the module. As shown in FIG. 5, the module tool 150 can include a first jaw: defining a first row of teeth offset vertically along a first axis by the pitch vertical distance between flip-disc pixels in the module; and defining a second row of teeth offset along the first axis, the second row offset horizontally from the first row by an integer multiple (e.g., 1×, 2×, or 3×) of the horizontal pitch distance between flip-disc pixels in the module. The first jaw can also include a handle extending rearward away from the first and second rows of teeth. The module tool 150 can include a similar second jaw—with first and second rows of teeth and a handle—spring-loaded against the first jaw to bias adjacent teeth (i.e., "teeth pairs") in the first and second jaws away from one another. Thus, a user may align the openings between teeth pairs in the module tool 150 with a subset of perforations or tabs in perimeter walls in flip-disc pixels within a module, depress the tool into contact with the perimeter walls, and then squeeze the handles to close teeth pairs against adjacent perforations or tabs and thus lock the tool to these features across the module. The user can then pull the module tool 150 to remove the module from the panel and disconnect data and/or power cables connecting the module to the panel and/or to other modules in the panel in order to separate the module fully from the panel, such as to service or replace the module without upsetting other modules or panels within the flip-disc display 102.

However, the module tool 150 can define any other form and can be confirmed to engage any other features within a module.

Furthermore, because flip-disc pixels may extend up to the end of a module, because adjacent modules within a panel may immediately abut, and because adjacent panels within a flip-disc display 102 may also immediately abut such that the flip-disc display 102 appears substantially continuous across all flip-disc pixels, the border of a module within a panel may not be immediately visually detectable by a user. Therefore, in response to receiving a request to service the flip-disc display 102 (e.g., from an external controller connected to the master controller 110 via a wired or wireless connection), the master controller 110 can transmit a service frame to the array of panels, wherein the service frame assigns a checkerboard pattern of color positions to modules in the flip-disc display 102 such that all flip-disc pixels in each module 130 in the flip-disc display 102 are assigned a common color position (e.g., black or white) differing from a color position assigned to all flip-disc pixels in each other module above, below, to the left, and to the right of the module by the service frame, as shown in FIG. 5. In particular, the service frame can specify a checkerboard pattern across the flip-disc display 102 wherein all flip-disc pixels in one module are assigned a single color position (e.g., black or white) that differs from the color position assigned to all flip-disc pixels in the modules above, below, to the left, and to the right of the module in order to visually distinguish the module from these adjacent modules. Panel controllers 121 throughout the flip-disc display 102 can then implement methods and techniques described above to implement this service frame; and the user can thus place the module tool 150 within one block of flip-disc pixels of the same color position, close the module tool 150, and draw the module tool 150 outwardly from its panel to remove the module from the flip-disc display 102.

Alternatively, the service display can assign a first color position to perimeter flip-disc pixels in each module 130 and a second color position to interior flip-disc pixels in each module 130 through the flip-disc display 102 to similarly visually indicate boundaries between adjacent modules. However, the service frame can assign any other color positions to pixels throughout the flip-disc display 102, and the master controller 110 and panel controllers 121 can cooperate in any other way to implement this service frame in order to assist a user in distinguishing the border between adjacent modules throughout the flip-disc display 102.

Generally, a flip-disc pixel 140 within a module 130 within a flip-disc display 102 may become faulty, such as due to mechanical wear from repeated inversions over time or due to collection of dust or other debris on the flip-disc pixel 140. A user can thus trigger the flip-disc display 102 to execute the service frame, implement the module tool 150 to extract a single module 130 containing the faulty flip-disc pixel 140, and then return the module 130 to its panel 120 once repaired or install a new module 130 into the panel 120, thereby quickly returning the panel 120 to full functionality without necessitating disassembly of the flip-disc display 102, removal of the entire panel 120 from the flip-disc display 102, or extensive disassembly of the panel 120.

Similarly, a panel power supply 122 within a panel 120 may become faulty after a period of time, which may prevent operation of the panel 120. Rather than dismantle the flip-disc display 102 to access the panel power supply 122 or otherwise replace the entire panel 120, a user may implement the module tool 150 to remove select modules from the panel to gain access to the faulty power supply 122. For example to correct a faulty power supply 122 within a panel 120, the user can: trigger the flip-disc display 102 to execute the service frame, as described above; implement the module tool 150 to extract a subset of (e.g., two) modules from key positions within the panel 120 to access the faulty power supply 122; remove a set of screws or other fasteners to separate the faulty power supply 122 from the panel 120; install a new panel power supply 122 into the panel 120; and then return the subset of modules to their positions within the panel 120 to complete the repair.

Therefore, a panel 120 in the display system 120 can include a removable panel power supply 122 mounted to the chassis 128 and arranged behind a subset of modules in the panel. Modules can be configured for individual removal from their panels in order to enable both: rapid and simple repair or replacement of modules containing faulty flip-disc pixels; and rapid and simple replacement of a panel power supply 122 within a panel, thereby enabling rapid and simple maintenance of a flip-disc display 102 substantially regardless of the size of the flip-disc display 102 (e.g., from two to hundreds of panels) and regardless of whether the flip-disc display 102 is mounted to a wall or hung from a ceiling.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for updating a flip-disc display comprising an array of panels, each panel in the array of panels comprising a grid array of modules, each module in the grid array of modules comprising a grid array of flip-disc pixels, the method comprising:
   at a first panel controller electrically coupled to a first array of modules arranged within a first panel, accessing a new frame region defining a target color position of each flip-disc pixel in each module in the first panel;
   designating a subset of flip-disc pixels in the first panel for inversion during a current update cycle based on differences between target color positions of flip-disc pixels defined in the new frame region and current color positions of flip-disc pixels in the first panel;
   for each flip-disc pixel in the subset of flip-disc pixels, accessing an update command executable by a corresponding module in the first panel to invert the color position of the flip-disc pixel;
   defining an order for serially issuing update commands to each module in the first panel, the order skipping flip-disc pixels excluded from the subset of flip-disc pixels and specifying a discontinuous sequence of inversions of flip-disc pixels across an area of each module in the first array of the module; and
   during each update instance in a series of update instances in the current update cycle, serving a next update command to each module in the first panel to invert one flip-disc pixel in each module in the first panel according to the order for serially issuing update commands defined for each module in the first panel.

2. The method of claim 1:
   wherein designating the subset of flip-disc pixels in the first panel for inversion during the current update cycle comprises designating a first flip-disc pixel in a first module in the first panel for inversion from a first color position to a second color position based on differences between a target color position of the first flip-disc pixel defined in the new frame region and a current color position of the first flip-disc pixel;
   wherein accessing an update command executable by a corresponding module in the first panel to invert a flip-disc pixel comprises selecting a first bit array, from a set of bit arrays stored in memory, executable by the first module to invert the color position of the first flip-disc pixel; and
   wherein serving the next update command to each module in the first panel comprises serving the first bit array to the first module and triggering the first module to:

drive a first column electrode electrically coupled to the first flip-disc pixel in the first module to a high voltage;

drive a first row electrode electrically coupled to the first flip-disc pixel in the first module to a low voltage; and set remaining column electrodes and remaining row electrodes in the first module to high-impedance states.

3. The method of claim 1, wherein serving the next update command to each module in the first panel during each update instance in the current update cycle comprises:

during a first update instance in the current update cycle:

writing a first update command, corresponding to a first flip-disc pixel in a first module in the first panel, to a first buffer in the first module according to a first pixel order defined for the first module, the first flip-disc pixel contained in the subset of flip-disc pixels;

writing a second update command, corresponding to a second flip-disc pixel in a second module in the first panel, to a second buffer in the second module according to a second pixel order defined for the second module, the second flip-disc pixel contained in the subset of flip-disc pixels;

at a first time, activating trigger input channels in the first buffer and the second buffer to invert color positions of the first flip-disc pixel and the second flip-disc pixel substantially simultaneously; and at a second time succeeding the first time by an update instance duration, triggering each output channel in the first buffer and the second buffer to enter a high-impedance state; and during a second update instance succeeding the first update instance in the current update cycle:

writing a third update command, corresponding to a third flip-disc pixel in the first module, to the first buffer according to the first pixel order, the third flip-disc pixel contained in the subset of flip-disc pixels;

writing a fourth update command, corresponding to a fourth flip-disc pixel in the second module, to the second buffer according to the second pixel order, the fourth flip-disc pixel contained in the subset of flip-disc pixels;

at a third time, activating trigger input channels in the first buffer and the second buffer to invert color positions of the third flip-disc pixel and the fourth flip-disc pixel substantially simultaneously; and at a fourth time succeeding the third time by the update instance duration, triggering each output channel in the first buffer and the second buffer to enter the high-impedance state.

4. The method of claim 1:

wherein accessing the update command executable by a corresponding module in the first panel to invert the color position of the flip-disc pixel for each flip-disc pixel in the subset of flip-disc pixels comprises, for each flip-disc pixel in the subset of flip-disc pixels:

identifying a first module address of a first module, in the first panel, containing a first flip-disc pixel in the subset of flip-disc pixels;

identifying a first pixel address of the first flip-disc pixel in the first module;

selecting a first update command from a lookup table based on the first pixel address and a target color position of the first flip-disc pixel specified in the new frame; and assigning the first update command to the first module address; and wherein serving the next update command to each module in the first panel during each update instance in the current update cycle comprises writing the first update command to the first module according to the first module address assigned to the first update command and according to a first pixel order defined for the first module.

5. The method of claim 1:

wherein designating the subset of flip-disc pixels in the first panel for inversion during the current update cycle comprises designating a first subset of flip-disc pixels in a first module in the first panel for inversion during the current update cycle based on differences between target color positions of flip-disc pixels in the first module defined in the new frame region and current color positions of flip-disc pixels in the first module;

wherein defining the order for serially issuing update commands to each module in the first panel comprises defining a second pixel order for the first subset of update commands according to a checkerboard pattern, each site in the checkerboard pattern corresponding to one flip-disc pixel in the first module; and wherein serving the next update command to each module in the first panel during each update instance in the current update cycle comprises, during the series of update instances, sequentially serving one update command in the first subset of update commands to the first module according to the first pixel order.

6. The method of claim 1:

wherein designating the subset of flip-disc pixels in the first panel for inversion during the current update cycle comprises designating a first subset of flip-disc pixels in a first module in the first panel for inversion during the current update cycle based on differences between target color positions of flip-disc pixels in the first module defined in the new frame region and current color positions of flip-disc pixels in the first module;

wherein defining the order for serially issuing update commands to each module in the first panel comprises:

identifying a predominant border between flip-disc pixels currently in a first color position and flip-disc pixels currently in a second color position in the first module; and defining a first pixel order for the first subset of update commands according to proximity of corresponding flip-disc pixels in the first module to the predominant border in the first module; and wherein serving the next update command to each module in the first panel during each update instance in the current update cycle comprises, during the series of update instances, sequentially serving one update command in the first subset of update commands to the first module according to the first pixel order.

7. The method of claim 1:

wherein designating the subset of flip-disc pixels in the first panel for inversion during the current update cycle comprises:

designating a first subset of flip-disc pixels in a first module in the first panel for inversion during the current update cycle based on differences between target color positions of flip-disc pixels in the first module defined in the new frame region and current color positions of flip-disc pixels in the first module;

designating a second subset of flip-disc pixels in a second module in the first panel for inversion during the current update cycle based on differences between target color positions of flip-disc pixels in the second module defined in the new frame region and current color positions of flip-disc pixels in the second module;

wherein defining the order for serially issuing update commands to each module in the first panel comprises:
  defining a first pseudorandom order for the first subset of update commands; and
  defining a second pseudorandom order for the second subset of update commands; and wherein serving the next update command to each module in the first panel during each update instance in the current update cycle comprises, during the series of update instances:
  sequentially serving one update command in the first subset of update commands to the first module according to the first pseudorandom order; and
  sequentially serving one update command in the second subset of update commands to the second module according to the second pseudorandom order.

8. The method of claim 1:
wherein designating the subset of flip-disc pixels in the first panel for inversion during the current update cycle comprises:
  for each module in the first panel, identifying a group of flip-disc pixels, arranged in the module, for inversion during the current update cycle based on differences between target color positions of flip-disc pixels in the module defined in the new frame region and current color positions of flip-disc pixels in the module;

wherein accessing the update command for each flip-disc pixel in the subset of flip-disc pixels comprises, for each module in the first panel:
  generating a group of update commands corresponding to the group of flip-disc pixels, in the module, designated for inversion during the current update cycle;

wherein defining the order for serially issuing update commands to each module in the first panel comprises, for each module in the first panel:
  defining a pixel order for the module and assigning each update command, in the group of update commands associated with the module, to one update instance in the series of update instances in the current update cycle,
  wherein a combination of pixel orders for modules in the first panel minimizes a number of update commands assigned to each update instance in the series of update instances in the current update cycle; and wherein serving the next update command to each module in the first panel during the current update cycle comprises, during each update instance in the current update cycle, selectively distributing update commands to modules in the set of modules according to pixel orders assigned to each module in the first panel.

9. The method of claim 8:
wherein defining the order for serially issuing update commands to each module in the first panel comprises, at the first panel controller:
  for each module in the first panel, defining the pixel order for the module and assigning each update command, in the group of update commands associated with the module, to one update instance in the series of update instances in the current update cycle;

further comprising, at a second panel controller electrically coupled to a second panel arranged within a second panel adjacent the first panel:
  for each module in the second panel, defining a pixel order for the module and assigning each update command, in a group of update commands associated with the module, to one update instance in the series of update instances in the current update cycle; and wherein the combination of pixel orders for modules in the first panel and pixel orders for modules in the second panel minimizes a number of update commands assigned to each update instance in the series of update instances in the current update cycle.

10. The method of claim 1, further comprising:
  at the first panel controller, in response to serving a last update command corresponding to a last flip-disc pixel in the subset of flip-disc pixels to a corresponding module in the first panel, returning confirmation of the new frame region to a master controller configured to control the flip-disc display; and
  at the master controller, in response to receipt of confirmation from each panel controller in the flip-disc display:
    selecting a second frame; and
    serving the second frame to the array of panels in the flip-disc display.

11. The method of claim 10, wherein selecting the second frame at the master controller comprises, during playback of a video by the flip-disc display, selecting the second frame, succeeding the new frame in the video, nearest in time receipt of confirmation from a last panel controller in the flip-disc display.

12. The method of claim 1:
wherein designating the subset of flip-disc pixels in the first panel for inversion during the current update cycle comprises:
  accessing a preceding frame region defining preceding target color positions for each flip-disc pixel in the first panel during a preceding update cycle;
  calculating an update image by subtracting the preceding frame region from the new frame region, the update image comprising:
    positive pixel values signaling inversion of corresponding flip-disc pixels in the first panel to a first color position during the current update cycle;
    negative pixel values signaling inversion of corresponding flip-disc pixels in the first panel to a second color position during the current update cycle; and
    null pixel values signaling no change to corresponding flip-disc pixels in the first panel during the current update cycle; and wherein accessing the update command executable by a corresponding module in the first panel to invert the color position of the flip-disc pixel for each flip-disc pixel in the subset of flip-disc pixels comprises accessing an update command for each positive pixel value and for each negative pixel value in the update image.

13. The method of claim 1, wherein accessing the new frame region comprises, at the first panel controller:
  receiving a new frame from a master controller configured to control the flip-disc display; and extracting the new frame region corresponding to an area of the first panel and defining a target color position of each flip-disc pixel in the first panel.

14. The method of claim 13, further comprising:
at the first panel controller, passing a remainder of the new frame to a second panel controller electrically coupled to a second panel arranged within a second panel adjacent the first panel;
at the second panel controller:
  accessing a second new frame region defining a target color position of each flip-disc pixel in each module in the second panel;
  designating a second subset of flip-disc pixels in the second panel for inversion during the current update cycle based on differences between target color positions of flip-disc pixels defined in the second new frame region and current color positions of flip-disc pixels in the second panel;
  for each flip-disc pixel in the second subset of flip-disc pixels, accessing an update command executable by a corresponding module in the second panel to invert the color position of the flip-disc pixel; and
  during each update instance in the current update cycle, serving a next update command to each module in the second panel to invert one flip-disc pixel in each module in the second panel synchronized with inversion of one flip-disc pixel in each of a subset of modules in the first panel.

15. The method of claim 1, further comprising:
at a master controller configured to control the flip-disc display, in response to receiving a request to service the flip-disc display, transmitting a service frame to the array of panels, the service frame assigning a checkerboard pattern of color positions to modules in the flip-disc display, all flip-disc pixels in each module in the flip-disc display assigned a common color position differing from a color position assigned to all flip-disc pixels in each other module above, below, to the left, and to the right of the module by the service frame; and
at the first panel controller:
  accessing a service frame region defining a target color position of each flip-disc pixel in each module in the first panel during a service period;
  designating a second subset of flip-disc pixels in the first panel for inversion during a second update cycle based on differences between target color positions of flip-disc pixels defined in the service frame region and current color positions of flip-disc pixels in the first panel;
  for each flip-disc pixel in the second subset of flip-disc pixels, accessing an update command executable by a corresponding module in the first panel to invert the color position of the flip-disc pixel; and
  during the second update cycle, serving update commands for each flip-disc pixel in the second subset of flip-disc pixels to each corresponding module in the first panel to visually indicate borders between each module in the first panel.

16. A method for updating a flip-disc display comprising an array of panels, each panel in the array of panels comprising a grid array of modules, each module in the grid array of modules comprising a grid array of flip-disc pixels, the method comprising:
at a first panel controller electrically coupled to a first array of modules arranged within a first panel, accessing a new frame region defining a target color position of each flip-disc pixel in each module in the first panel;
for each module in the first panel:
  identifying a subset of flip-disc pixels in the module for inversion during a current update cycle based on a difference between pixel values in the new frame region and current color positions of corresponding pixels in the module;
  compiling a set of update commands for the module for the current update cycle, each update command in the set of update commands corresponding to a particular flip-disc pixel in the module and executable by the module to invert the color position of the particular flip-disc pixel; and
  defining a pixel order for serially issuing update commands in the set of update commands to the module, the pixel order skipping flip-disc pixels excluded from the subset of flip-disc pixels and specifying a discontinuous sequence of inversions of flip-disc pixels in the subset of flip-disc pixels to yield a substantially uniform distribution of flip-disc pixel inversions across an area of the module; and
during each update instance in a sequence of update instances within the current update cycle, distributing next update commands, in sets of update commands compiled for the current update cycle, to each corresponding module in the first panel according to pixel orders defined for each set of update commands.

17. A display system comprising:
a set of panels arranged in a global grid array, each panel in the set of panels comprising:
  a chassis;
  a panel controller; and
  a set of modules transiently coupled to the chassis in a regional grid array and electrically coupled to the panel controller, each module in the set of modules comprising:
    a set of parallel and offset column electrodes;
    a set of parallel and offset row electrodes, each row electrode in the set of row electrodes crossing over and electrically isolated from the set of column electrodes;
    a driver configured to selectively drive each column electrode in the set of column electrodes and each row electrode in the set of row electrodes between a high-voltage state, a low-voltage state, and a high-impedance state according to an update command received from the panel controller; and
    a set of flip-disc pixels arranged in a local grid array across the module, each flip-disc pixel comprising:
      a disc support arranged proximal an intersection of one column electrode in the set of column electrodes and one row electrode in the set of row electrodes;
      a disc arranged in the disc support, defining a first color across a first side, and defining a second color across a second side opposite the first side; and
      an electromagnetic element proximal the disc support and electrically coupled to one column electrode in the set of column electrodes and one row electrode in the set of row electrodes, configured to flip the disc to expose the first side of the disc when the column electrode is driven to the high-voltage state and the row electrode is driven to the low-voltage state, and configured to flip the disc to expose the second side of the disc when the column electrode is driven to the low-voltage state and the row electrode is driven to the high-voltage state; and a master controller configured to serve a sequence of frames to panel controllers in the set of panels; and wherein, upon receipt of a frame from the controller, each panel controller selectively issues update commands to the driver in the corresponding module to invert a subset of flip-disc pixels in the corresponding module according to target color positions specified in the frame for the subset of flip-disc pixels.

18. The display system of claim 17:

wherein the set of panels comprises a first panel comprising a first panel controller and a first array of modules;

wherein the first panel controller is configured to:
- access a new frame region defining a target color position of each flip-disc pixel in each module in the first panel;
- for each module in the first panel:
  - identify a subset of flip-disc pixels in the module for inversion during a current update cycle based on a difference between pixel values in the new frame region and current color positions of corresponding pixels in the module;
  - compile a set of update commands for the module for the current update cycle, each update command in the set of update commands corresponding to a particular flip-disc pixel in the module and executable by the module to invert the color position of the particular flip-disc pixel; and
  - define a pixel order for serially issuing update commands in the set of update commands to the module, the pixel order skipping flip-disc pixels excluded from the subset of flip-disc pixels and specifying a discontinuous sequence of inversions of flip-disc pixels in the subset of flip-disc pixels to yield a substantially uniform distribution of flip-disc pixel inversions across an area of the module; and
- during each update instance in a sequence of update instances within the current update cycle, distribute next update commands, in sets of update commands compiled for the current update cycle, to each corresponding module in the first panel according to pixel orders defined for each set of update commands.

19. The display system of claim 17:

wherein each panel further comprises a power supply;

wherein each module comprises:
- a set of standoffs configured to transiently engage a chassis in a panel; and
- a power port configured to electrically couple to a power supply in the panel; and further comprising a module tool:
- configured to selectively remove a single module from a panel; and
- comprising a set of teeth operable in a first position to engage features on a subset of flip-disc pixels in the single module and operable in a set position to release features on the subset of flip-disc pixels in the single module.

20. The display system of claim 19:

wherein the master controller is further configured to transmit a service frame to the array of panels in response to receiving a request to service the set of panels, the service frame assigning a checkerboard pattern of color positions to modules in the set of panels, all flip-disc pixels in each module in the set of panels assigned a common color position differing from a color position assigned to all flip-disc pixels in each other module above, below, to the left, and to the right of the module by the service frame; and at a first panel controller in a first panel, in the set of panels:
- accessing a service frame region defining a target color position of each flip-disc pixel in each module in the first panel during a service period;
- designating a subset of flip-disc pixels in the first panel for inversion during a service update cycle based on differences between target color positions of flip-disc pixels defined in the service frame region and current color positions of flip-disc pixels in the first panel;
- for each flip-disc pixel in the subset of flip-disc pixels, accessing an update command executable by a corresponding module in the first panel to invert the color position of the flip-disc pixel; and
- during the service update cycle, serving update commands for each flip-disc pixel in the second subset of flip-disc pixels to each corresponding module in the first panel to visually indicate borders between each module in the first panel prior to extraction of a particular module from the first panel with the module tool.

* * * * *